(12) United States Patent
Donia et al.

(10) Patent No.: US 11,151,653 B1
(45) Date of Patent: Oct. 19, 2021

(54) METHOD AND SYSTEM FOR MANAGING DATA

(71) Applicant: Decision Resources, Inc., Burlington, MA (US)

(72) Inventors: Travis Donia, Burlington, MA (US); Shih-Yin Ho, Burlington, MA (US); Mitchell Smith, Burlington, MA (US)

(73) Assignee: Decision Resources, Inc., Burlington, MA (US)

( * ) Notice: Subject to any disclaimer, the term of this patent is extended or adjusted under 35 U.S.C. 154(b) by 549 days.

(21) Appl. No.: 15/623,998

(22) Filed: Jun. 15, 2017

Related U.S. Application Data

(60) Provisional application No. 62/350,983, filed on Jun. 16, 2016.

(51) Int. Cl.
*G06F 16/00* (2019.01)
*G06Q 40/06* (2012.01)
(Continued)

(52) U.S. Cl.
CPC .......... *G06Q 40/06* (2013.01); *G06F 16/245* (2019.01); *G06F 16/258* (2019.01)

(58) Field of Classification Search
CPC ... H04N 21/44222; H04N 2005/91328; H04N 2005/91364; H04N 21/42201; H04N 21/4532; H04N 5/782; H04N 5/913; G06F 3/048; G06F 3/00; G06F 3/0481; G06F 3/0482; G06F 9/453; G06F 16/954; G06F 2216/15; G06F 21/10; G06F 13/16;
(Continued)

(56) References Cited

U.S. PATENT DOCUMENTS 5,991,731 A 11/1999 Colon et al.
6,618,727 B1 9/2003 Wheeler et al.
(Continued)

FOREIGN PATENT DOCUMENTS

EP 0067057 A2 12/1982
WO 2013082177 A1 6/2013

OTHER PUBLICATIONS

"Definition Parallel processing", whatis.com, 2007, 4 pages.
(Continued)

*Primary Examiner* — Shyue Jiunn Hwa
(74) *Attorney, Agent, or Firm* — GTC Law Group PC & Affiliates

(57) ABSTRACT

A platform for implementing a method of aggregating and contextualizing metrics relevant to developing, launching and marketing a target therapeutic or related therapy. The method of processing the metrics includes retrieving data related to the target from one or more data sources and synthesizing the retrieved target data in a contextual manner and creating synthesized target data by converting unstructured data into structured data including an event, wherein an event comprises a corpus of data from a single source on a single date. The synthesized target data is stored in a target specific database and a user may query the database regarding the target, where the query includes at least one search parameter. The user query is processed against the synthesized target data in the target specific database and the results are presented to the user.

30 Claims, 32 Drawing Sheets

(51) Int. Cl.
*G06F 16/245* (2019.01)
*G06F 16/25* (2019.01)

(58) Field of Classification Search
CPC .. G06F 13/4068; G06F 13/4265; G06F 11/14;
G06F 11/1448; G06F 11/1451; G06F
11/1458; G06F 11/1464; G06F 11/1469;
G06F 11/2094; G06F 11/3034; G06F
11/3476; G06F 40/284; G06F 16/3329;
G06F 16/3344; G06F 16/93; G06F
16/9535; G06F 16/334; G06F 40/169;
G06F 40/20; G06F 16/338; G06F 40/253;
G06F 16/335; G06F 16/35; G06F 40/30;
G06F 9/48; G06F 9/4881; G06F 19/00;
G06F 40/279; G06F 16/24522; G06F
16/24578; G06F 16/248; G06F 16/38;
G06F 16/9024; G06F 11/0703; G06F
11/079; G06F 11/366; G06F 16/00; G06F
16/243; G06F 16/24575; G06F 16/2477;
G06F 16/313; G06F 16/3334; G06F
19/325; G06F 40/151; G06F 40/289;
G06F 8/37; G06K 9/00369; G06K
9/00342; G06K 9/62; A61K 36/00; A61K
2300/00; G01N 2030/8813; G01N 30/02;
G01N 2500/00; G01N 30/88; G01N
33/15; G01N 33/5097; G01N 33/6842;
B01D 15/322; B01D 15/325; C12Q
1/025; C40B 40/04
See application file for complete search history.

(56) References Cited

U.S. PATENT DOCUMENTS

| | | | | |
|---|---|---|---|---|
| 6,904,423 | B1 * | 6/2005 | Nicolaou | G06N 5/02 706/46 |
| 7,054,823 | B1 * | 5/2006 | Briegs | G06F 19/36 705/2 |
| 7,386,460 | B1 | 6/2008 | Frank et al. | |
| 7,634,475 | B1 | 12/2009 | Hernek | |
| 7,827,125 | B1 | 11/2010 | Rennison | |
| 8,725,552 | B2 | 5/2014 | Hyde et al. | |
| 2003/0028413 | A1 | 2/2003 | White et al. | |
| 2003/0113797 | A1 * | 6/2003 | Jia | A61K 36/00 435/7.1 |
| 2003/0177118 | A1 | 9/2003 | Moon et al. | |
| 2003/0177240 | A1 | 9/2003 | Gulko et al. | |
| 2003/0225601 | A1 | 12/2003 | Hayden et al. | |
| 2004/0093331 | A1 | 5/2004 | Garner et al. | |
| 2004/0205576 | A1 | 10/2004 | Chikirivao et al. | |
| 2005/0246314 | A1 | 11/2005 | Eder | |
| 2006/0064415 | A1 | 3/2006 | Guyon et al. | |
| 2006/0129427 | A1 | 6/2006 | Wennberg | |
| 2006/0173663 | A1 | 8/2006 | Langheier et al. | |
| 2006/0206374 | A1 | 9/2006 | Asthana et al. | |
| 2006/0287997 | A1 | 12/2006 | Rugh | |
| 2007/0011134 | A1 | 1/2007 | Langseth et al. | |
| 2007/0143300 | A1 | 6/2007 | Gulli et al. | |
| 2007/0174086 | A1 | 7/2007 | Walker | |
| 2007/0282824 | A1 | 12/2007 | Ellingsworth | |
| 2008/0140616 | A1 | 6/2008 | Encina et al. | |
| 2008/0243997 | A1 | 10/2008 | Bouzid et al. | |
| 2009/0150323 | A1 | 6/2009 | Hively | |
| 2009/0319518 | A1 | 12/2009 | Koudas et al. | |
| 2011/0078145 | A1 | 3/2011 | Chung et al. | |
| 2011/0145301 | A1 | 6/2011 | Fabret et al. | |
| 2011/0314006 | A1 | 12/2011 | Sweeney et al. | |
| 2012/0246174 | A1 | 9/2012 | Spears et al. | |
| 2012/0290319 | A1 | 11/2012 | Saria et al. | |
| 2013/0060771 | A1 | 3/2013 | Ho et al. | |
| 2013/0095864 | A1 * | 4/2013 | Marovets | H04L 51/08 455/466 |
| 2013/0138478 | A1 | 5/2013 | Hyde et al. | |
| 2014/0330846 | A1 | 11/2014 | Hyde et al. | |
| 2015/0312200 | A1 * | 10/2015 | Brav | G06F 40/253 709/206 |
| 2016/0004578 | A1 * | 1/2016 | Selig, IV | G06F 9/44505 719/313 |
| 2016/0275112 | A1 | 9/2016 | Hyde et al. | |
| 2020/0151157 | A1 | 5/2020 | Hyde et al. | |

OTHER PUBLICATIONS

12854440, "European Application Serial No. 12854440, European Search Report dated Nov. 16, 2016", Decision Resources LLC DR, dated Nov. 16, 2016, 5 pages.
PCT/US2012/066883, "International Application Serial No. PCT/US2012/066883, International Preliminary Report on Patentability dated Mar. 27, 2013", DR/Decision Resources, LLC, 5 pages.
PCT/US2012/066883, "International Application Serial No. PCT/US2012/066883, International Search Report and Written Opinion dated Mar. 27, 2013", DR/Decision Resources, LLC, 7 pages.

* cited by examiner

FIG. 3B

| Generic Name<br>Brand Name<br>Manufacturer Name | donepezil<br>Aricept<br>Eisai Pfizer<br>—304A | rivastigmine<br>Exelon<br>Novartis<br>—304B | rivastigmine, transdermal patch<br>Novartis<br>—304C | galantamine<br>Reminyl/Razadyne<br>Shire, Janssen<br>—304D |
|---|---|---|---|---|
| 302A NICE | Recommend | Recommend | | Recommend |
| 302B Date of Review | March 2011 | March 2011 | | March 2011 |
| IQWIG Date of Review | | | | |
| Generic Name | donepezil | rivastigmine | rivastigmine, transdermal patch | galantamine |
| 302C AHRQ | No Recommendation | No Recommendation | | No Recommendation |
| 302D Date of Review | April 2010 | April 2010 | | April 2010 |
| 302E SMC Date of Review | Recommend | Recommend | | Recommend |
| | October 2010 | October 2010 | | October 2010 |
| IQWIG Date of Review | | | | |
| Generic Name | donepezil | rivastigmine | rivastigmine, transdermal patch | galantamine |
| 302F | Recommended with Restrictions | Recommended with Restrictions | | Recommended with Restrictions |

FIG. 3C

ALZHEIMER'S DISEASE PREVALENCE

| | POPULATION | PREVALENCE | DETAILS |
|---|---|---|---|
| UNITED STATES | 308,745,538 | 5,310,423 (1.72%) | Third party source: Alzheimer's association est (using dementia) http://www.alz.org/index.asp |
| CANADA | 34,019,000 | 500,079 (1.47%) | Third party source: http://www.alzheimer.ca/english/media/adfacts2011.htm Canadian AD est. |
| UK | 81,792,080 | 747,683 (1.21%) | Third party source: Alzheimer's association est (using dementia) http://www.alz.org/index.asp Scotland AD association (includes all dementia) http://www.alzscot.org/pages/statistics.htm |
| FRANCE | 65,312,249 | 849,059 (1.30%) | Third party source: http://www.ncbi.nlm.nih.gov/pubmed/19298895 |
| GERMANY | 81,471,834 | 896,190 (1.10%) | Third party source: http://www.ncbi.nlm.nih.gov/pubmed/10844818 |
| AUSTRALIA | 21,766,711 | 269,907 (1.24%) | Third party source: http://www.alzheimers.org.au/understanding-dementia/statistics.aspx |

Drugs Reviewed for Alzheimer's Disease

NICE (2011 Review)

PUTTING IT IN CONTEXT — 306

Timestamp: 8/24/2011 4:24:17 PM

Back to Main | Search Results | Save Search | Export to XLS | Export to PDF and Print

| | | | | |
|---|---|---|---|---|
| Generic Name<br>Brand Name<br>Manufacturer Name | Donepezil<br>Aricept<br>Eisai, Pfizer | rivastigmine<br>Exelon<br>Novartis | galantamine<br>Reminy/Razzadyne<br>Shire, Janssen | Memantine<br>Ebixa/Namenda<br>Lundbeck, Merz Forest |
| Source Documents: | Alzheimer's Disease<br>NICE 2010-prelim report<br>Alzheimer's Disease<br>NICE 2011 | Alzheimer's Disease<br>NICE 2010-prelim report<br>Alzheimer's Disease<br>NICE 2011 | Alzheimer's Disease<br>NICE 2010-prelim report<br>Alzheimer's Disease<br>NICE 2011 | Alzheimer's Disease<br>NICE 2010-prelim report<br>Alzheimer's Disease<br>NICE 2011 |
| Last Updated: | 1/8/2011 | 6/11/2011 | 6/11/2011 | 1/8/2011 |
| Dosage Evaluated | 5-10 mg/day | 3-6mg/BID | 16-24mg/day | 10mg BID |
| Evidence Sources<br>(Clinical) | Oct 2010 review- 5 new RCTs.<br><br>June 2010 review - Studies published<br><br>placebo. | Oct 2010 review- 3 new RCTs.<br><br>June 2010 review - Studies published<br><br>placebo. | Oct 2010 review- 3 new RCTs.<br><br>June 2010 review - Studies published<br><br>placebo. | Oct 2010 review- 1 new RCT.<br><br>June 2010 review - Studies published<br><br>placebo. |
| Evaluators | Peninsula Technology Assessment Group (PenTAG) | Peninsula Technology Assessment Group (PenTAG) | Peninsula Technology Assessment Group (PenTAG) | Peninsula Technology Assessment Group (PenTAG) |

| Evaluators | Assessment Group (PenTAG) | Assessment Group (PenTAG) | Assessment Group (PenTAG) | Assessment Group (PenTAG) |
|---|---|---|---|---|
| Generic Name | donepezil | rivastigmine | galantamine | memantine |
| Decision | Recommend | Recommend | Recommend | Recommend with Restrictions |
| Date of Review | March 2011 | March 2011 | March 2011 | March 2011 |
| Eligible Patient Population | Mild, Moderate | Mild, Moderate | Mild, Moderate | Moderate, Severe |
| Key Criteria | Clinical Effectiveness Cost Effectiveness | Clinical Effectiveness Cost Effectiveness | Clinical Effectiveness Cost Effectiveness | Clinical Effectiveness Cost Effectiveness |
| Stated Clinical Reason for Decision | Clinical Benefit.... | There is a...... | There is a...... | For memantine...... |
| Stated Economic Reason for Decision | According to...... | According to...... | According to...... | N/A |

| Generic Name | donepezil | rivastigmine | galantamine | memantine |
|---|---|---|---|---|
| Key Study Questions | 1. Effectiveness...... | 1. Effectiveness...... | 1. Effectiveness...... | 1. Effectiveness...... |

313

FIG. 3G putting it in context

Alzheimer's Disease

This data was last updated Jun 23, 2011

Based on 41 reviews from 2005–2011 across 8 agencies: AHRQ, SMC, NICE, IQWIG, PBAC, CADTH, HAS, and DERP representing 7 countries: United States, Scotland, United Kingdom, Germany, Australia, Canada, and France for 5 therapeutics: donepezil, (Aricept) rivastigmine-transdermal patch (Exelon Patch), rivastigmine (Exelon), galantamine (Reminyl), and memantine (Ebika)

| REVIEW INFROMATION | YEAR | US FDA & PATENT INFORMATION |
|---|---|---|
| | 1997 | November-Donepezil........ |
| | 1998 | |
| | 1999 | |
| | 2000 | April-Rivastigmine........ |
| | 2001 | February-Galantamine........ June-Galantamine........ |
| | 2002 | |
| | 2003 | October-Memantine oral........ |
| | 2004 | October-Donezepil 5mg/10mg........ |
| | 2005 | April-Galantamine capsule........ April-Memantine oral........ |
| DERP reviews the four AD drugs........ June is issued | 2006 | |
| SMC reviews and approves........ August severe AD | | |

Clinical Trials Search Results (Summary)

Refine Search

View Details

Name of the Disease/Condition: acute lymphoblastic leukemia

Number of Studies/Trials: 150
Phase I: 21 trials, 21 sponsors  (NIH: 0, Industry: 9, US Fed: 0, Other: 12)
Phase II: 34 trials, 34 sponsors  (NIH: 1, Industry: 1, US Fed: 0, Other: 32)
Phase III: 11 trials, 11 sponsors  (NIH: 0, Industry: 2, US FED: 0, Other: 9)
Phase IV: 13 trials, 13 sponsors  (NIH: 0, Industry: 0, US Fed: 0, Other: 13)

Number of open studies: 89

Number of closed or terminated studies: 21

Number of compounds:
Phase I: 38
Phase II: 81
Phase III: 19
Phase IV: 72

Average timeline and enrollment:
Phase I: XX months, 483 patients
Phase II: XX months, 2690 patients
Phase III: XX months, 4088 patients
Phase IV: XX months, 8530 patients

Eligibility Criteria:

Genders Eligible for Study: Both

Ages Eligible for Study: 4 Years to 15 Years

Inclusion Criteria:
* Children with acute lymphoblastic leukemia diagnosis
* Authorization from both parents or legal guardians for recruiting of the child into the study with consent signed form after the purpose and procedures have been explained.
* Must be able to swallow capsules of DHA or placebo
* Malnutrition Exclusion Criteria:
* Patients had received radiotherapy or chemotherapy
* Parents who decide to decline the study.

268

Emory University
Sirolimus; PEG Asparaginase
Study of Sirolimus with PEG Asparaginase in Acute Lymphoblastic Leukemia 2009  2010  2011  2012

243 months
02/09-04/29

119 months
08/09-06/19 th Acute Lymphoblastic Leukemia (ALL)
29 months
09/10-02/13

| Agency | Date | Drug reviewed (generic) | Indication Under Reimbursement Review | Reimbursement decision | Line of therapy | Reason for decision (economic) | Reason for decision (clinical) | Restrictions (category) | Activity | Add |
|---|---|---|---|---|---|---|---|---|---|---|
| NICE | 11/2015... | | | | | | | | 6 Events |  |
| | 11/2015... | ombitasvir-paritaprevir-ritonavir | For the treatment of treatment-naive or treatment experienced patients with CHC genotype 4 with compensated cirrhosis. | Recommend without restrictions | 1+ | Greater cost-effectiveness | Greater efficacy/effectiveness | No Restrictions | |  |

Decision Reason - Clinical (Details) Details 
The Committee was aware that the trials did not include any of the comparators listed in the final NICE scope and noted the weaknesses associated with studies that used historical controls. The committee noted the limited available evidence in people with genotype 4 HCV. The Committee recommended the treatments for all subgroups in line with the marketing authorisation The Committee recommended the treatments for all subgroups in line with the marketing authorisation
Is Review an Update or Resubmission?
No
Decision Reason - Economic (Details)
The ICERs based on the scenario 1 analysis and using the contract prices for ombitasvir-paritaprevir-ritonavir+dasabuvir were all below £20,000 per QALY gained.

FIG. 8A

| Agency | Date | Indication Under Reimbursement Review | Reimbursement decision | Line of therapy | Reason for decision (economic) | Reason for decision (clinical) | Restrictions (category) | Activity | Add |
|---|---|---|---|---|---|---|---|---|---|
| CADTH | 06/2014 | For the treatment of genotype 1 CHC. | No decision | 1+ | N/A | Acceptable efficacy/ effectiveness | | 1 Event | 🔍 |

Drug reviewed (generic): asunaprevir

| Agency | Date | Indication Under Reimbursement Review | Reimbursement decision | Line of therapy | Reason for decision (economic) | Reason for decision (clinical) | Restrictions (category) | Activity | Add |
|---|---|---|---|---|---|---|---|---|---|
| PBAC | 03/2015... | In combination with daclatasvir, for the treatment of treatment-naïve adult CHC patients with genotype 1b HCV who also h ... | Do not recommend | 1 (+ 1 more) | Lower cost-effectiveness | Lower efficacy/ effectiveness (+ 1 more) | | 2 Events | 🔍 |

FIG. 9B

Variable Group Core

Name: Core
Item Specific: Yes
Active: Yes

Variables

| | Name | Display Name | Type | Clean? |
|---|---|---|---|---|
| ≡ | Indication | Indication Under Reimbursement Review | Text | Yes |
| ≡ | PBAC special listing requested | PBAC Special Listing Requested | Text | Yes |
| ≡ | Line of therapy | Line of Therapy | Multiselect | Yes |
| ≡ | Adjunct therapy? | Adjunct Therapy? | Multiselect | No |
| ≡ | Adjunct to what? | Adjunct to what? | Text | No |
| ≡ | Route of administration | Route of Administration | Multiselect | Yes |
| ≡ | Dosage | Dosage | Text | Yes |

[Edit]

FIG. 10

New Variable

- Admin name
- Display name
- Variable groups — Select Some Options
- Default value
- Data type — Select a data type
- Reference type
- Reference attribute
- Reference filter
- Reference domain — Select an Option
- Description — Formats ▾ File ▾ Edit ▾ Insert ▾ View ▾ Format ▾ Table ▾ B I

METHOD AND SYSTEM FOR MANAGING DATA

RELATED APPLICATIONS

This application claims priority to U.S. provisional patent application Ser. No. 62/350,983, filed Jun. 16, 2016, entitled "Method And System For Managing Data And Configuring A Workflow For Converting Unstructured Data Into Structured Data Sets," the entire contents of which is hereby incorporated by reference for all purposes.

BACKGROUND

Pharmaceutical and biotechnology companies struggle to gauge the risks of a compound achieving its potential in the marketplace at various points in a product's lifecycle. In essence, the ability to understand the composite sense of risk requires modeling multiple critical bodies of data from major world markets including: expected clinical trial performance, (likely ranges of new drug reimbursement), regulatory body decisions, patent life and overall clinical risk among others. Risk is a way to determine value, as value is a function of how much risk one has to bear in order to gain a return. Reimbursement serves as the main market context for understanding R&D risk. The need to reflect relative risk for a product across multiple markets' benchmarking data determines the range of reimbursement risk and return.

The information required to assess composite risk and, therefore, to make better strategic decisions, is generally available in the public domain. However, at present, the information is fragmented and often requires intelligent data cleaning and organization. As a result, industry and investors tend to rely on consultants and expert opinion to provide insights for licensing and/or acquisition considerations, proper modeling of reimbursement likelihood for products and developing recommendations for additional development investment. There is widespread dissatisfaction with this qualitative approach as it is slow, expensive and fails to accurately quantify or predict risk, considering that an alarming 70% of trials fail to meet timelines; and many drugs are deemed as "me too," are denied reimbursement by major groups of payers and fail to realize meaningful commercial potential.

Accordingly, there is a need for a more sophisticated tool for presenting information related to assessing composite risk associated with a pharmaceutical drug.

In addition, pharmaceutical and biotechnology companies also utilize clinical trial data to determine the efficacy of particular drugs as well as to determine what criteria and endpoints are expected among other development products in the pipeline. In essence, companies use the information both to inform their own trial design and success as well as understand their competitors' approach. Hence, the number of reasons for accessing clinical trial data and meta-data is quite varied. At present, much clinical trial data is not organized in a logical manner for understanding the marketplace. As such, the process of mining relevant data is often haphazard and cumbersome.

Accordingly, there is a need for a more sophisticated tool for presenting information related to assessing data related to clinical trials of a drug.

Still further, there is a need for managing data in a controlled, repeatable and accessible manner.

SUMMARY OF THE INVENTION

A risk metrics information platform implemented as a reimbursement risk tracker application facilitates gathering, synthesizing and presenting risk related data to users to foster a better understanding of pricing and reimbursement market risk for pipeline compounds and marketed pharmaceutical products. In one embodiment, the reimbursement risk tracker application provides a visually intuitive dashboard to help demonstrate how different global agencies look at a drug class or a therapeutic area. In another embodiment, a clinical trial tracker similarly facilitates gathering, synthesizing and presenting of data relating to studies and outcomes across a number of different markets to foster a better understanding of the evaluation criteria as well as the conclusions of clinical trial studies.

In one aspect, a method of processing data related to a target is implemented in a computer, where the computer comprises a processor and a memory configured to store a plurality of instructions executable by the processor to implement the method, the method comprising: retrieving data related to the target from one or more data sources; synthesizing the retrieved target data in a contextual manner and creating synthesized target data by converting unstructured data into structured data including an event, wherein an event comprises a corpus of data from a single source on a single date; storing the synthesized target data in a target specific database; receiving a user query regarding the target, the query comprising at least one search parameter; processing the received user query against the synthesized target data in the target specific database; and presenting results from the user query processed against the synthesized target data.

In one aspect, each event has a corresponding version identifier.

In another aspect, each event has a corresponding owner, wherein only the owner can edit the information in the event.

In another aspect, the processing method includes defining a domain comprising a plurality of variable groups, wherein each domain comprises a dataset of variables and identifying information.

In one aspect, the user query is directed to clinical trial results with respect to the target.

In one aspect, the target comprises one of: a target drug; or a target therapeutic treatment.

BRIEF DESCRIPTION OF THE DRAWINGS

For a better understanding of the disclosed system, and to show how the same may be carried into effect, reference will now be made, by way of example only, to the accompanying drawings, in which:

FIGS. 3A-3H illustrate exemplary user interface (UI) UI screen shots generated by a reimbursement risk tracking software application, in accordance with an embodiment of the disclosed system;

FIGS. 5A-5F illustrate exemplary UI screen shots generated by a clinical trial tracking software application, in accordance with an embodiment of the disclosed system;

FIG. 8A illustrates a first portion of an exemplary user interface that allows a User to inspect more detailed information about a smaller number of results;

FIG. 9B illustrates a second portion of the user interface of FIG. 9A.

FIG. 10 illustrates an exemplary user interface for a Variable Group;

FIG. 11 illustrates an exemplary user interface for a New Variable;

FIGS. 12-14 illustrate exemplary user interfaces for assignments of tasks and other functions related to the collection of data.

DETAILED DESCRIPTION

This application claims priority to U.S. provisional patent application Ser. No. 62/350,983, filed Jun. 16, 2016, entitled "Method And System For Managing Data And Configuring A Workflow For Converting Unstructured Data Into Structured Data Sets," the entire contents of which is hereby incorporated by reference for all purposes.

Technologies are disclosed herein for presenting relevant prescription drug related information to enable meaningful composite risk assessment. By way of the present disclosure, a sophisticated risk metrics information platform may aggregate, synthesize and present relevant drug related information to enable meaningful composite risk assessment such that companies can benefit by understanding the risk-return tradeoff and thereby reduce risk in their investment decisions associated with pharmaceutical clinical development, market receptivity and portfolio management.

The present disclosure will be more completely understood through the following description, which should be read in conjunction with the attached drawings. In this description, like numbers refer to similar elements within various embodiments of the present disclosure. The skilled artisan will readily appreciate that the methods and systems described herein are merely exemplary and that variations can be made without departing from the spirit and scope of the disclosure.

Figure 1:
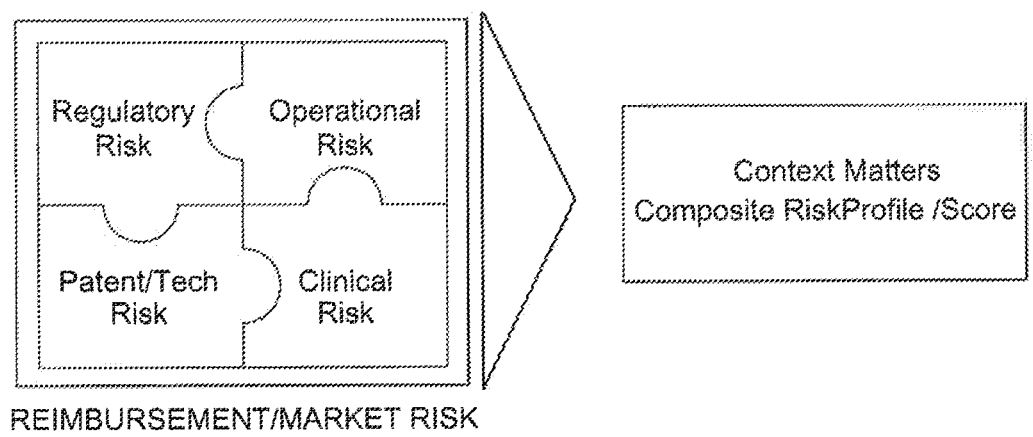
FIG. 1 illustrates a conceptual representation of various types of risk that contribute towards a composite risk assessment in accordance with an embodiment of the disclosed system.

Referring now to FIG. 1, a conceptual representation of various types of risk that contribute towards a composite risk assessment in accordance with an embodiment of the disclosed system. The sophisticated risk metrics information platform disclosed herein is capable of aggregating and contextualizing data along at least five dimensions of risk that are relevant in developing, launching and marketing therapeutics, including but not limited to, operational risk, regulatory risk, patent and technology risk and clinical risk, which collectively contribute to reimbursement risk. Moreover, the sophisticated risk metrics information platform can create a more reliable and reproducible approach than consultants by providing a common and standardized dataset of risk metrics information and tools built to answer key business questions on risk and return. The disclosed risk metrics information platform also provides online analytical tools and information dashboards that allow comparisons of relevant metrics that are both searchable and applicable to analytical models as well as to identify previously unseen patterns in regulatory decisions, cross-company clinical trial performance, investigator availability, drug coverage policy decisions, comparative effectiveness decisions and patient populations, amongst others. As such, over time, predictive algorithms that will determine the most likely successes and failures in a development pipeline can be derived from historical trends and performances.

System Implementation

Figure 2A:
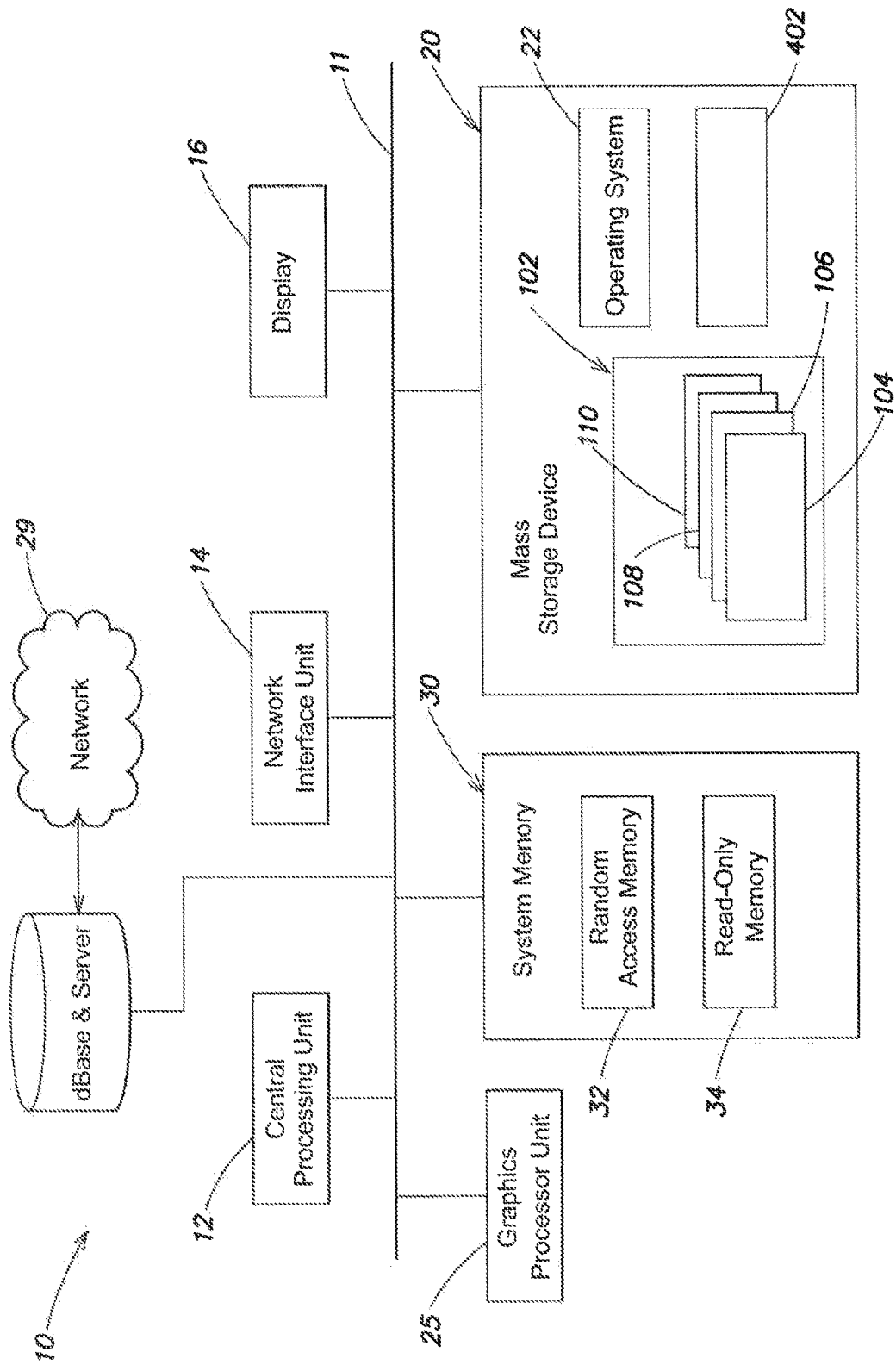
FIG. 2A illustrates conceptually a system architecture, respectively in which the system disclosed herein may be implemented.
Figure 2B:
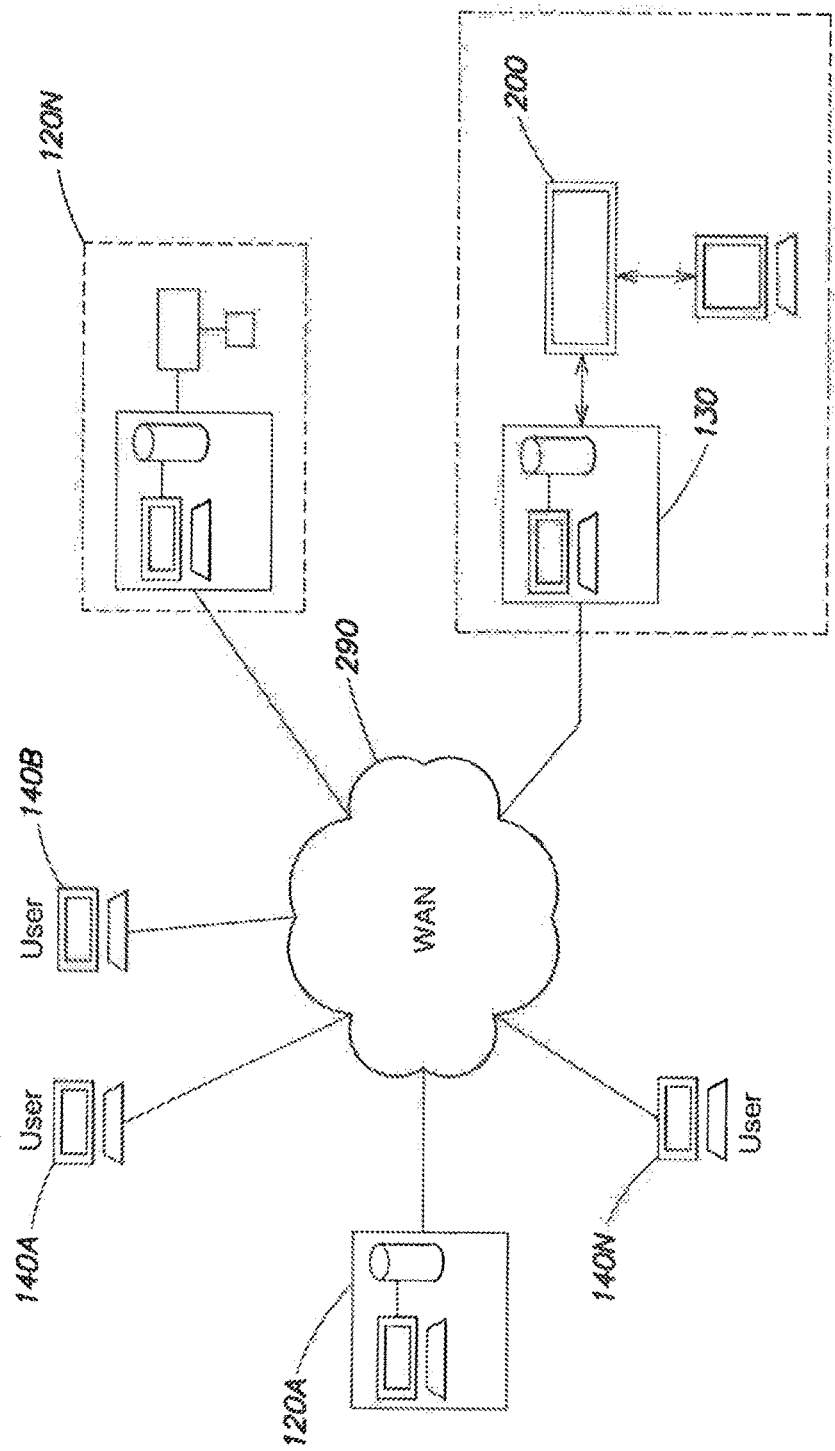
FIG. 2B illustrates conceptually a network environment in which the system and techniques disclosed herein may be implemented.
Figure 2C:
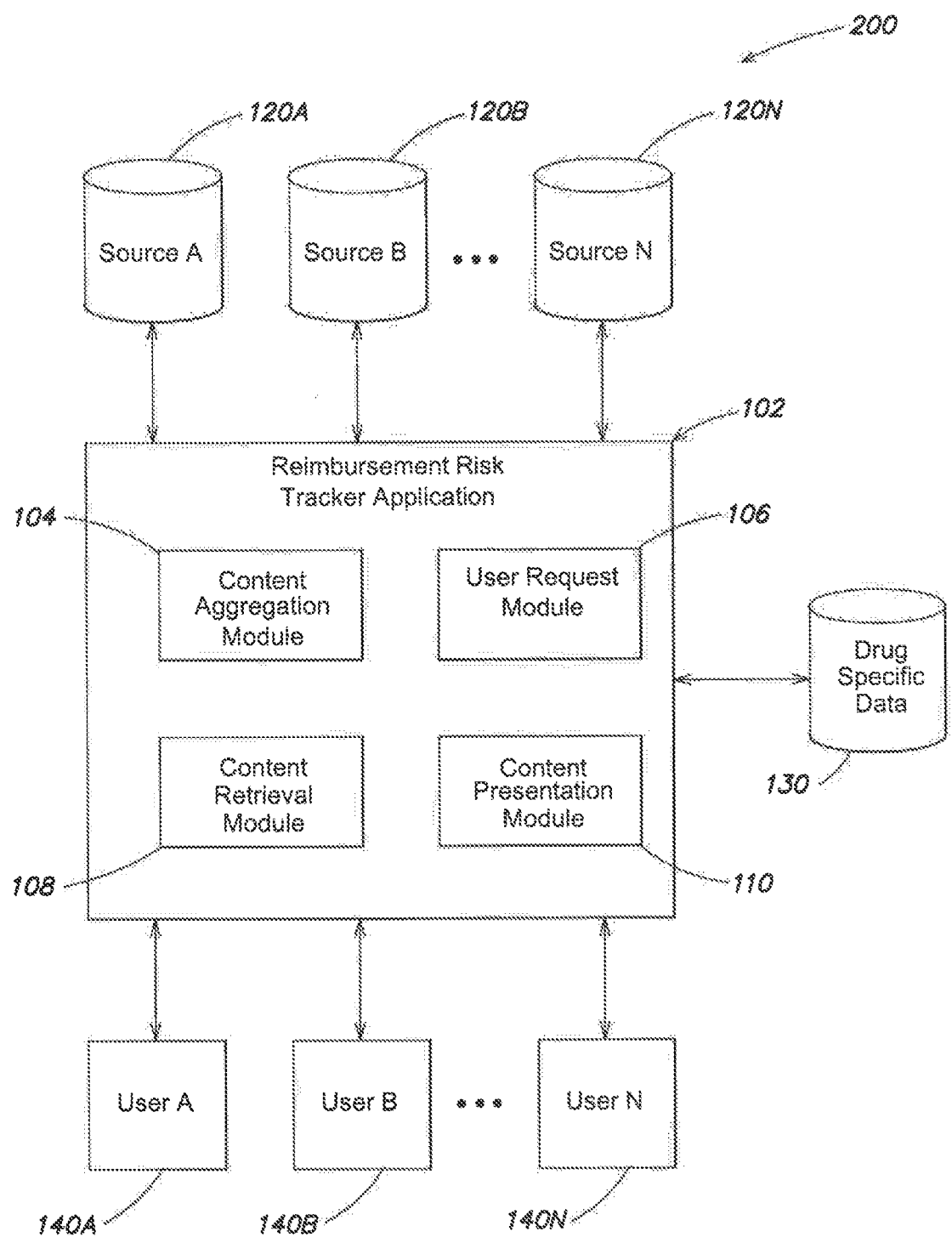
FIG. 2C illustrates conceptually a computer architecture for gathering, synthesizing and presenting risk related data to users in accordance with an embodiment of the disclosed system.
Figure 4:
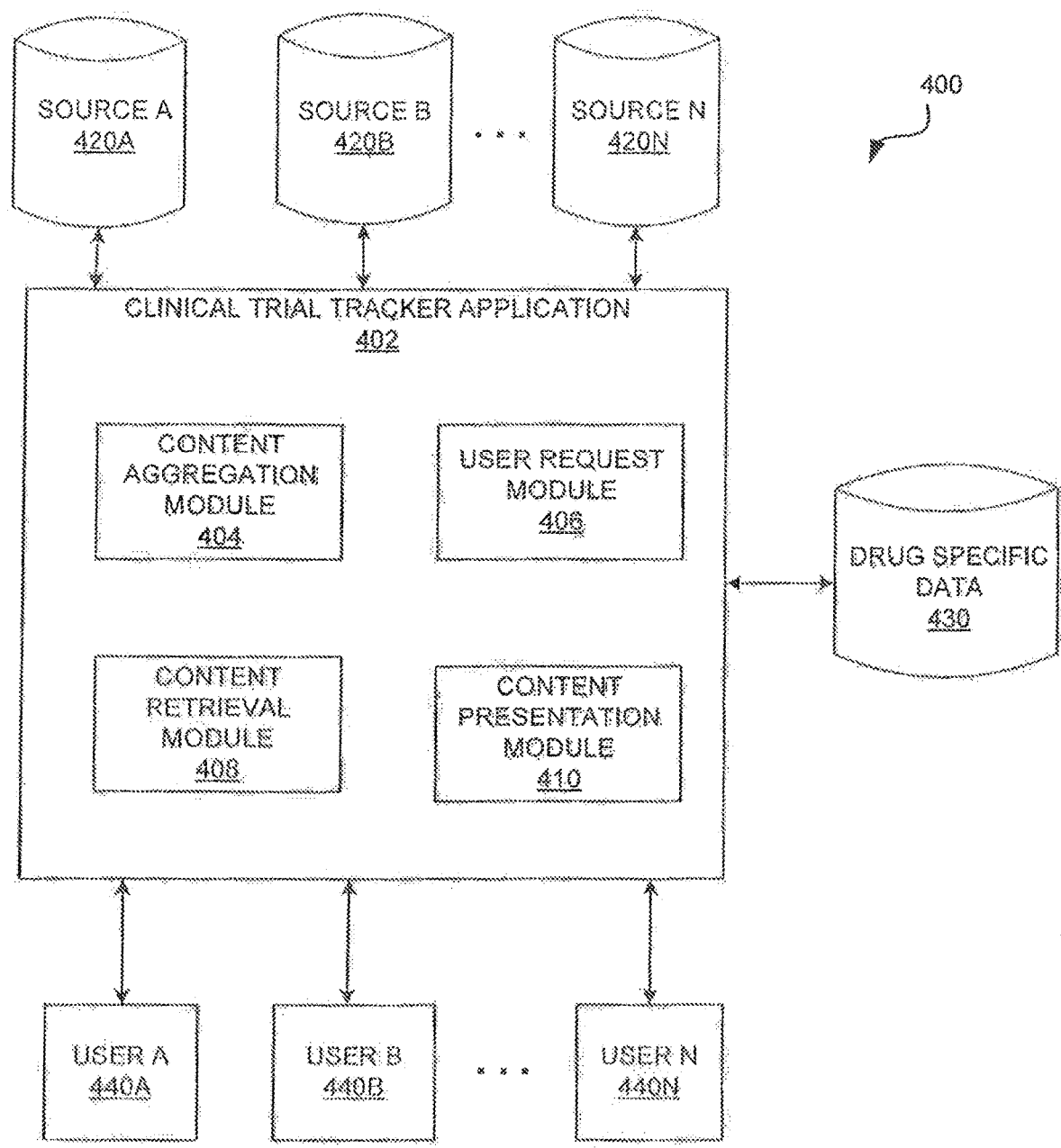
FIG. 4 illustrates a computer architecture for gathering, synthesizing and presenting clinical trial data to users in accordance with an embodiment of the disclosed system.

FIG. 2A illustrates conceptually a computer architecture 10 which may be implemented in any of the systems illustrated in FIGS. 2B-C and 4 to perform methods described herein. As illustrated in FIG. 2A, computer architecture 10 comprises a central processing unit 12 (CPU), a system memory 30, including one or both of a random access memory 32 (RAM) and a read-only memory 34 (ROM) and a system bus 11 that couples the system memory 30 to the CPU 12. An input/output system containing the basic routines that help to transfer information between elements within the computer architecture 10, such as during startup, can be stored in the ROM 34. The computer architecture 10 may further include a mass storage device 20 for storing an operating system 22, data and various program modules, such as the applications 102 and 402, as well as their constituent components, as described herein.

The mass storage device 20 may be connected to the CPU 12 through a mass storage controller (not illustrated) connected to the bus 11. The mass storage device 20 and its associated computer-readable media can provide non-volatile storage for the computer architecture 10. Although the description of computer-readable media contained herein refers to a mass storage device, such as a hard disk or CD-ROM drive, it should be appreciated by those skilled in the art that computer-readable media can be any available computer storage media that can be accessed by the computer architecture 10.

By way of example, and not limitation, computer-readable media may include volatile and non-volatile, removable and non-removable media implemented in any method or technology for the non-transitory storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer architecture 10.

According to various embodiments, the computer architecture 10 may operate in a networked environment using logical connections to remote physical or virtual entities through a network such as the network 29. The computer architecture 10 may connect to the network 29 through a network interface unit 14 connected to the bus 11. It will be appreciated that the network interface unit 14 may also be utilized to connect to other types of networks and remote computer systems. In one embodiment, network interface 14 includes the necessary transceiver hardware (not shown) to communicate wirelessly with other network devices or processes. The computer architecture 10 may also include an input/output controller for receiving and processing input from a number of other devices, including a keyboard, mouse, electronic stylus, microphone, touch sensitive screen, etc. (not illustrated). Similarly, an input/output controller may provide output to a video display 16, a printer, or other type of output device. A dedicated graphics processor 25 unit may also be connected to the bus 10.

As mentioned briefly above, a number of program modules comprising sequences of executable instructions and data files may be stored in the mass storage device 20 and RAM 32 of the computer architecture 10, including an operating system 22 suitable for controlling the operation of a networked desktop, laptop, server computer, or other computing environment. The mass storage device 20, ROM 34 and RAM 32 may also store one or more program modules. In particular, the mass storage device 20, optionally in conjunction with RAM 32, may store the executable instructions that comprise applications 102 and 402, as described herein, as well as other program modules for execution by the CPU 12. Application 102 comprises program modules 104, 106, 108 and 110 for implementing the processes discussed in detail with respect to FIG. 2D as well as the other computational communication properties described herein. According to various embodiments, the applications 102 and 402, as described hereinafter, may also be stored remotely on the network 29 and accessed by any computer within the network 29. Also database(s) 130 and its accompanying server process may be coupled directly to the bus 11 of system 10 or may be remotely connected thereto via network 29.

The software modules may include software instructions that, when loaded into the CPU and executed, transform a general-purpose computing system into a special-purpose computing system customized to facilitate all, or part of, the data processing techniques disclosed herein. As detailed throughout this description, the program modules may provide various tools or techniques by which the device or computer architecture may participate within the overall systems or operating environments using the components, logic flows and/or data structures discussed herein.

The CPU 12 may be constructed from any number of transistors or other circuit elements, which may individually or collectively assume any number of states. More specifically, the CPU 12 may operate as a state machine or finite-state machine. Such a machine may be transformed to a second machine, or specific machine by loading executable instructions contained within the program modules. These computer-executable instructions may transform the CPU 12 by specifying how the CPU 12 transitions between states, thereby transforming the transistors or other circuit elements constituting the CPU 12 from a first machine to a second machine, wherein the second machine may be specifically configured to manage the generation of portfolios and/or decisions. The states of either machine may also be transformed by receiving input from one or more user input devices associated with the input/output controller, the network interface unit 14, other peripherals, other interfaces, or one or more users or other actors. Either machine may also transform states, or various physical characteristics of various output devices such as printers, speakers, video displays, or otherwise.

Encoding of executable computer program code modules may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage and the like. For example, if the storage media are implemented as semiconductor-based memory, the program modules may transform the physical state of the system memory when the software is encoded therein. For example, the software may transform the state of transistors, capacitors, or other discrete circuit elements constituting the system memory.

As another example, the storage media may be implemented using magnetic or optical technology. In such implementations, the program modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description. FIG. 2A illustrates a network environment in which the system and techniques may be implemented in accordance with the disclosure.

FIG. 2B illustrates conceptually a network environment in which the system and techniques disclosed herein may be implemented. As illustrated in FIG. 2B, the computer server 200, which includes the reimbursement risk tracker application 102, interconnected via a communication network topology 29, typically a combination of LAN and WAN networks, e. g. the Internet, to one or more data sources 120A-N, generally referred to herein as data sources 120, one or more drug specific relational databases 130, and one or more users 140A-N, generally referred to herein as users 140. Network topology 29, may comprise any combination of analog or digital, packet-switched or circuit-switched, hard wired or wireless, optical or other transmission medium in any combination which facilitates communication and interoperability between server 200, data sources 120, relational databases 130 and users 140. In an illustrative embodiment the above-described computer architectures and the network environment may be deployed utilizing in a multi-tier architecture, including a web browsers, a Web server/application server and one or more databases. Note that each of server 200, data sources 120, relational databases 130 and users 140 may be implemented with a computer system similar or similar to that illustrated in FIG. 2A and may have associated there with its own memory storage facilities, including, possibly, a relational database. Database 130 may be implemented with scale relational database architectures, built on Ruby on Rails, an open source full-stack web application framework for the Ruby programming language that enables data entry consistency, audit trail and permissioning.

The protocols utilized to facilitate communication between the various components within the network environment posted in FIG. 2B may be any currently utilized protocol, and may be left discretion of the designer. Typically, a user initiates a session with the web server/application server tier using a standard web browser. Dynamically-generated web pages may be rendered in the browser from any of Hypertext Markup Language (HTML), Cascading Style Sheets (CSS) and JavaScript languages. A user interface for querying and accessing data, as generated by user request module 106, may be implemented using JavaScript code executing on the web browser on any of the systems of users 140 for most responsive performance. Query result contents, as well as content in other regions of web pages, may be updated without a full page redraw by data transmitted using Asynchronous JavaScript (AJAX) and XML protocols.

A web server/application server executing as part of application 102 or on a separate system may be written in Java and creates user session following a logon request from a browsers. Thereafter, the web server processes user requests, retrieving data from the database(s) 130, performing any necessary transformations, and returning the necessary data to the requesting users browser in any HTML, CSS and JavaScript, or other protocols.

Reimbursement Risk Tracker Software Application

Referring now to FIG. 2C, an embodiment of a system architecture for gathering, synthesizing, and presenting risk related data to users is shown. The sophisticated risk metrics information platform can be implemented as a reimbursement risk tracker application 102 that facilitates a better understanding of the pricing and reimbursement market risk for pipeline compounds and marketed products.

Generally speaking, the reimbursement risk tracker application 102 provides a visually intuitive dashboard to help demonstrate how different global markets, such as the UK, Scotland, Canada, Germany, France, Australia, and the U.S., and payers view and value prescription drug products and to help pharmaceutical companies better understand the criteria by which their products will be evaluated. At a country market level, analysis is often manifested in comparative effectiveness prescription drug product reviews that include meta-analysis of select clinical trial data to demonstrate clinical or economic differences among prescription drug products used to treat a particular disease condition. Companies can use the reimbursement risk tracker application 102 to gain a better sense about the reimbursement environment for new therapeutic areas, particularly if there isn't any experience base from which to draw internally. By assessing risk in a manner that allows client/users to look across multiple markets and view information across multiple dimensions at once, the reimbursement risk tracker application 102 provides greater confidence in recognizing both drug losers as well as winners.

Reimbursement risk tracker application 102 also facilitates modeling of market sizing and access and an understanding of how different markets look at a drug class or a therapeutic area. In addition, the reimbursement risk tracker application 102 facilitates recognizing how those views can change and evolve across time based on new products entering the market, old products coming off patent protection, new forms of treatment and economic/budgetary needs of a particular market, amongst others.

Referring now more specifically to FIG. 2C, the computer 200 includes the reimbursement risk tracker application 102, which is configured to retrieve data from one or more data sources 120A-N, synthesize the retrieved data in a contextual manner, store the synthesized data in a drug specific relational database 130 and present relevant drug related information from the drug specific relational database 130 to one or more users 140A-N. It can be appreciated that users of the reimbursement risk tracker application 102 may include customers, such as pharmaceutical and insurance companies, universities, researchers and the like.

The data sources 120 may be publicly available information that is stored remotely at storage locations accessible to the reimbursement risk tracker application 102 over a network, such as a private local network, or a public network, such as the Internet. The data sources may be websites that store drug related information, including but not limited to, drug agencies that evaluate drugs, medical references, such as journals, thesis, papers and publications, university databases, amongst others. In embodiments, sources 120, may be any source of relevant information which is network accessible to system 200, however, in many instances data sources 120 will comprise previously screened reputable scientific databases associated with one or more regulatory agencies, universities, pharmaceutical companies, research institutions, etc. In some instances, sources 120 may also comprise information in hard copy (not electronic) format. The data sources 120 may also be provided in an electronic format such as, for example and not limited to, an electronic spreadsheet in Microsoft Excel (.xls or .xlsx) format or via an API, as would be understood by one of ordinary skill in the art.

Figure 2D:
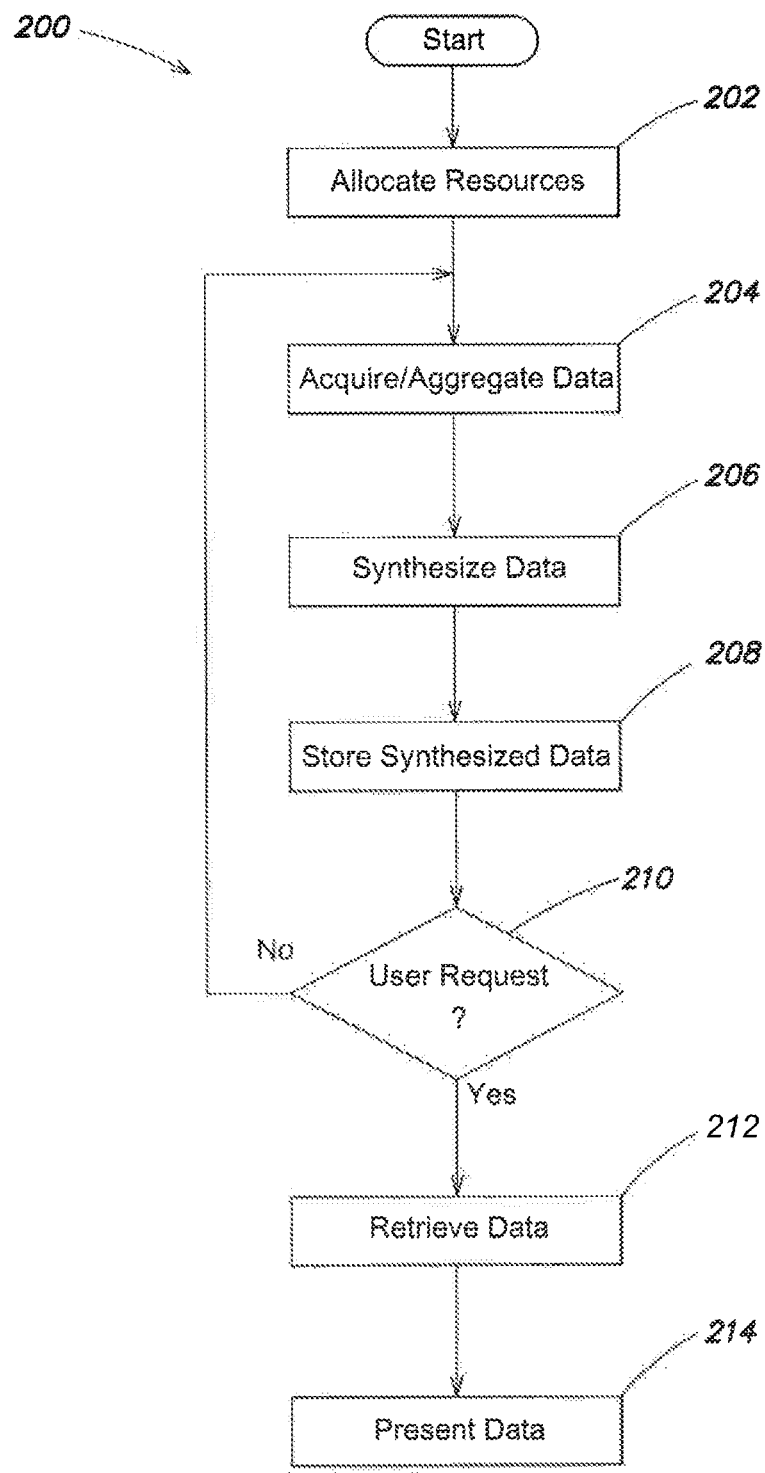
FIG. 2D illustrates conceptually a flow process in accordance with the techniques disclosed herein.

Reimbursement risk tracker application 102 comprises a content aggregation module 104, user request module 106, content retrieval module 108 and content presentation module 110, as described in further detail with reference to the process flow diagram of FIG. 2D. Specifically, FIG. 2D illustrates conceptually a flow process 200 in accordance with the techniques disclosed herein to enable the aggregation, synthesis, storage and presentation of data parameters relative to a pharmaceutical drug or other therapeutic treatment which enables users to assess risk across multiple markets and view information across multiple dimensions at once. To begin, appropriate resources are allocated within the relational database 130 for a particular parameter such as a disease, pharmaceutical drug, or other user-defined entity, as illustrated by process block 202. Next, content aggregation module 104 interacts with sources 120 to acquire content associated with a specific parameter, in this case a disease, as illustrated by process block 204. Module 104 may interact with sources 120 in a number of different ways. For example, content aggregation module 104 may pull data from one or more sources 120 at predefined intervals or with a predefined frequency. Alternatively, content aggregation module 104 may comprise or operate in conjunction with one or more applications, such as a web crawler, which searches for specific information from sources 120 or other sources over the Internet. Alternatively, content aggregation module 104 may be mainly directed manually by a system user through designation of the network addresses of specific databases or through more general querying based on one or more key search terms. Alternatively, sources 120 may be preconfigured, through either a network protocol or an applet executing in accordance therewith to push data to module 104 assistant all with a predetermined frequency, or on the occurrence of a predefined event, such as the initial availability of data containing key words, the publication of an article from a particular source, etc. Note, in the illustrative embodiment, the process of acquiring relevant data related to a specific drug, disease, or proprietor is typically ongoing to ensure the information available in database 130 is current and accurate.

Following acquisition of relevant data from sources 120, the acquired data is reviewed, categorized, screened for relevancy, reformatted for presentation and stored in database 130, all hereafter referred to as data "synthesis," as illustrated by process block 206. In various embodiments, the data is synthesized based on various characteristics or parameters. For instance, data may be identified by its relationship to a particular drug, a type of drug, a disease, or a geographic region, amongst others. Additional details regarding the type of data and the manner in which the drug is classified will become more apparent during a description of FIGS. 3A-3H. The synthesized data is then stored in the drug specific relational database 130, as illustrated by process block 208.

Aggregation module 104 may achieve synthesis of aggregated data in a number of different ways including presentation of the data for manual review by any user/operator/researcher of system 200. Alternatively, all or a portion of the data synthesis may be performed automatically by aggregation module 104 alone, or in conjunction with manual input or interoperability with sources 120. In embodiments, particularly where module 104 either pulls or receives data having any known format, software code within aggregation module 104 may recognize the format of the data and determine its relevance based on one or more predetermined rules. If relevant, the data may be reformatted, as necessary and stored in database 130 in a format suitable for presentation as described hereinafter.

In some embodiments, some of the operations performed by the content aggregation module 104 may be performed by a human user. For instance, a human may read through various agency reports to determine if the agency recommends a drug, determine the dosage of the drug and the like. The human may then provide the information to the content aggregation module 104 through a user interface for subsequent storage of such information in the drug specific relational database 130. In some embodiments, the content aggregation module 104 may also be configured to crawl through various documents retrieved from the sources to gather pertinent information. The information may be gathered using keyword searches, or similar content recognition technologies that currently exist.

The reimbursement risk tracker application 102 further comprises a user request module 106 configured to receive and process requests for data from the users 140 and a content retrieval module 108 configured to retrieve the requested data from the drug specific relational database 130. Substantially simultaneously with the ongoing acquisition of data from sources 120 by module 104, a web server application, which may be implemented as part of user request module 106 or separate therefrom, presents a network accessible user interface to online users 140 and receives requests therefrom, as illustrated by decision process block 210. Such requests will be in a format recognized by module 106 containing the appropriately formatted search query which enables content retrieval module 108 to retrieve the relevant data satisfying the user query, as illustrated by process block 212. The search engine functionality which retrieves the requested data from database 130 may be part of module 108 or may be implemented remotely over network along with database 130.

The reimbursement risk tracker application 102 further comprises a content presentation module 110 configured to present the requested data retrieved from database 130 by module 108, as illustrated by process block 214. Since the relationships between data fields stored in the database 130 are established when the data is synthesized and stored by the content aggregation module 104 such presentations may be in a format that is simple, clear and focused due to the manner in which the data is classified by the reimbursement risk tracker application 102, as will be apparent from the exemplary user interfaces illustrated in FIGS. 3A-3H and 5A-F.

The drug specific relational database 130 may include one or more databases that store drug and disease related content aggregated by the content aggregation module 104. Such databases may be configured in a centralized or distributed architecture over the network and may be redundant or mirrored to prevent loss of data or more efficient access. The data stored in the drug specific relational database 130 may be classified such that each item of data can be accessed by a user 140 through a search process. Data corresponding to a particular drug may be classified under the drug name, along with one or more parameters with which the drug is associated.

In the various embodiments, reimbursement risk tracker application 102 may enable faceted search by any of the following parameters:
 (i) Disease Condition
 (ii) Agency
 (iii) Drug Class
 (iv) Chemical Name
 (v) Brand
 (vi) Manufacturer
 (vii) Year In addition, searches may be performed according to a regulatory agency including, but not limited to any of the following:
 (i) AHRQ: Agency for Healthcare Research and Quality (U.S.)
 (ii) DERP: Oregon Drug Effectiveness Research Project (U.S.)
 (iii) CADTH: Canadian Agency for Drugs and Technology in Health (Canada)
 (iv) CCO: Cancer Care Ontario (Canada)
 (v) NICE: National Institute of Clinical Excellence (U.K.)
 (vi) NHS Scotland: National Health Services Scotland (U.K.)
 (vii) SMC: Scottish Medicines Consortium (U.K.)
 (viii) HAS: Haute autorité de santé (France)
 (ix) IqWig: Institute for Quality and Efficiency in Health Care (Germany)
 (x) PBAC: Pharmaceutical Benefits Advisory Committee (Australia)

In addition, searches may be performed for comparison of clinical and economic variables including according to the following parameters:
 (i) Decision Details
 (ii) Review Details
 (iii) Evaluator Information
 (iv) Therapeutic Information
 (v) Study Questions
 (vi) Evidence
 (vii) Outcomes
 (viii) Adverse Events
 (ix) Conclusions
 (x) Manufacturer Model Information
 (xi) Assessment Group Model Information
 (xii) Economic/Cost Data In various embodiments, the data has been aggregated and synthesized by tracker 102 so that searching of database 130 can provide disease condition data including any of the following:

(1) Disease Area Description and Recent News
(2) Standard Treatments
(3) Overview of Clinical Trial Activity
(4) Key Regulatory Information
(5) Pricing Data by Unit Price for:
   (i) United Kingdom
   (ii) Australia
   (iii) Germany
   (iv) Canada
(6) Automated Disease Condition Timeline to Track:
   (i) Reimbursement Reviews
   (ii) US Patents/Approvals (from the FDA Orange Book)
(7) Automated Reimbursement Decision Maps
(8) Prevalence/incidence data
(9) Population data In addition, application 102 allows users to set up Client Alerts for a Subscribed Disease Area. In other embodiments, tracker 102 may provide functionality for administrator data export for analytics, limited client data export/save and "favorite" search criteria functionality, depending on the implementation of database 130 and the search capabilities of content retrieval module 108, at the designer's discretion.

The reimbursement risk tracker application 102 provides companies with the ability to view prescription drug review decisions across a number of different markets to understand the evaluation criteria as well as the conclusions and recommendations that inform reimbursement decisions. The reimbursement risk tracker application 102 is configured to identify relevant data sources, aggregate relevant data from the data sources, as well as clean, standardize, organize and add or connect, relevant datasets in a meaningful manner. In addition, the reimbursement risk tracker application 102 is configured to determine which metrics matter and can build algorithms for those metrics. Moreover, the reimbursement risk tracker application 102 can generate customized reports from datasets with context to create wisdom from data.

The reimbursement risk tracker application 102 gives companies access to the most pertinent highlighted information from prescription drug reviews (comparative effectiveness and cost-effectiveness decisions) by payer agencies that serve as the basis for reimbursement decisions across multiple disease conditions. The proprietary designs of data visualization screens, as shown in FIGS. 3A-3H, provide for easy comparison across time (changes in comparative effectiveness decisions) and across markets. Information templates stored in conjunction with module 110 enable a system user to create meaningful risk metrics on reimbursement. Companies can search by disease conditions and select markets to gain a market view of how current products are being evaluated and viewed, allowing for calculations on trending, pricing threshold decisions and likelihood of reimbursement. The reimbursement risk tracker provides the context of risk for companies by displaying benchmarking information in a visual rendering that supports easy understanding of metrics and insights.

For instance, for a company interested in entering the Alzheimer's marketplace, it would be important to understand that global markets view the current Alzheimer's products with criteria centered around not just clinical efficacy, but actually around a modeled economic benefit. It would be beneficial to understand how that economic benefit translates into reimbursement and pricing guidance. Accordingly, the company may use the reimbursement risk tracker application 102 to retrieve relevant information and pertinent details.

FIGS. 3A-3H illustrate screen captures of an exemplary user interface (UI) generated by the reimbursement risk tracking software application 102, in accordance with an embodiment of the disclosed system. In particular, the UI screen shots shown in FIGS. 3C-3H relate to studying reimbursement risks associated with Alzheimer's, for exemplary purposes only.

Figure 3A:

Referring now to FIG. 3A, a screen shot of an exemplary user interface 300 of the reimbursement risk tracker application as part of a web-based application, including various search parameters and options by which a user 140 can retrieve data via the reimbursement risk tracker application 102, is illustrated showing an exemplary search for Alzheimer's disease being submitted to the reimbursement risk tracker application.

Figure 3B:
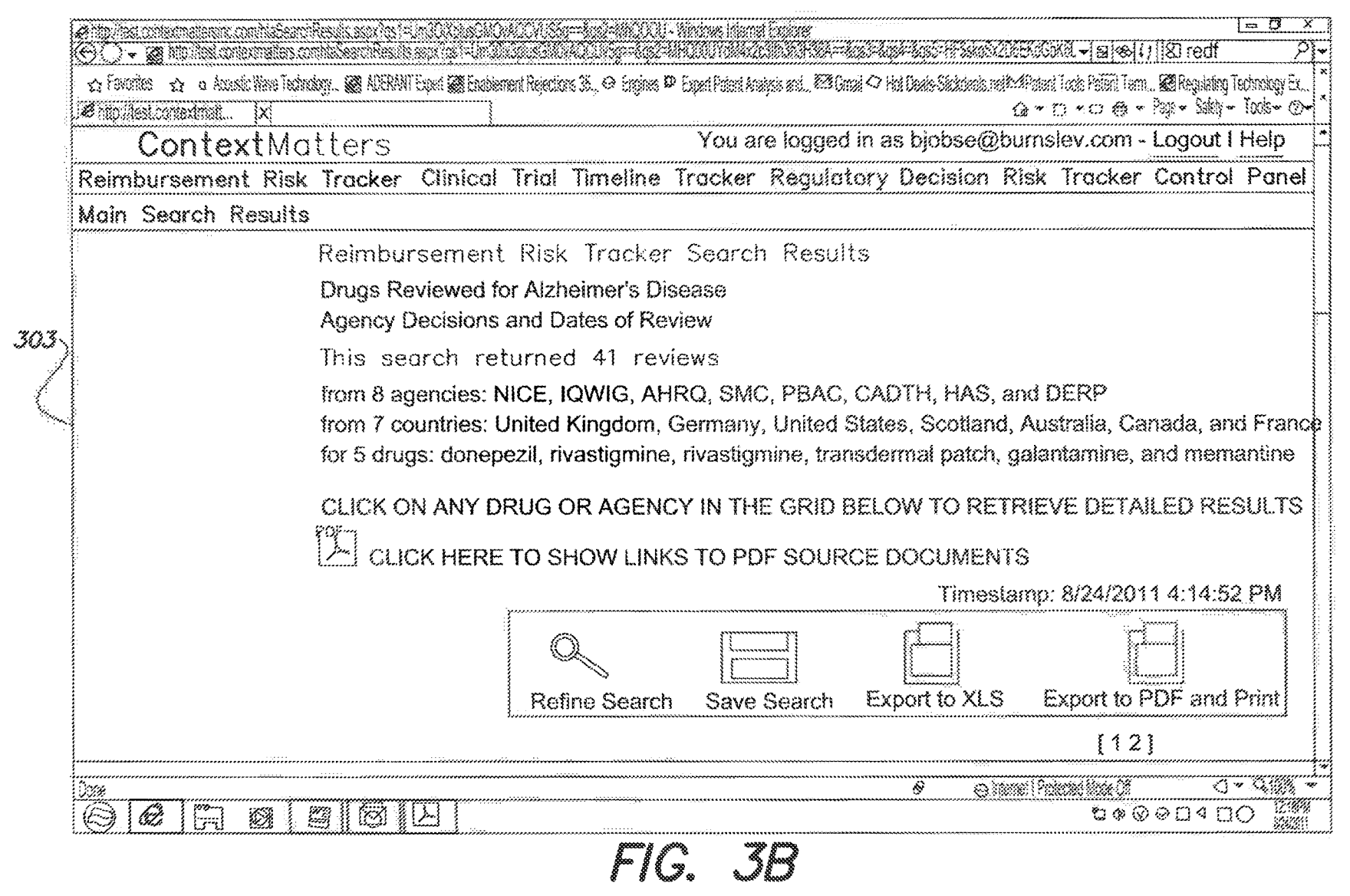
Figure 3D:
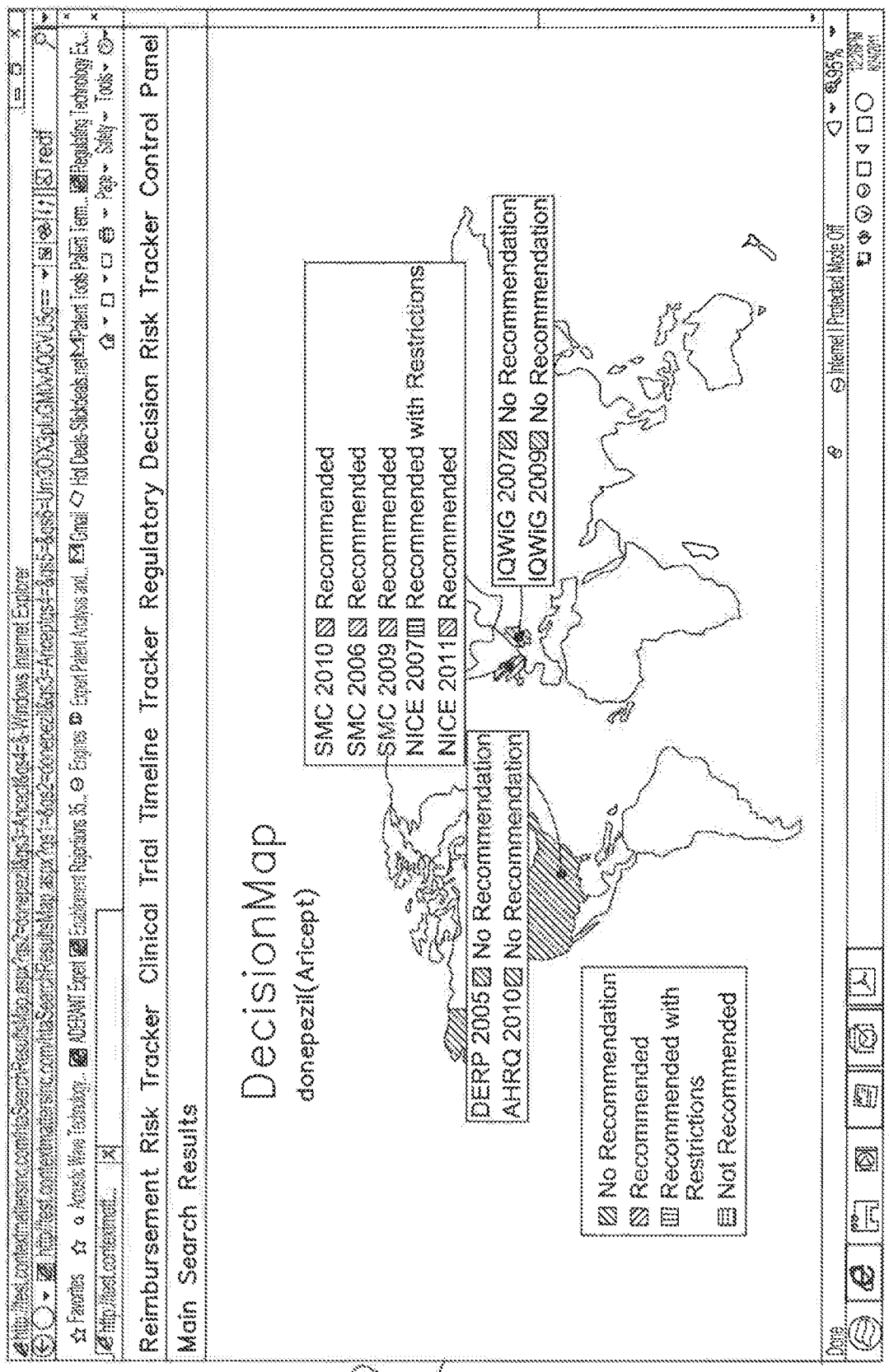

FIG. 3B is a screen shot of an exemplary user interface 303 illustrating the results of the exemplary search of FIG. 3A showing that 41 reviews were retrieved, of which eight reviews were from agencies in seven countries for five drugs. FIG. 3C is a screen shot of an exemplary user interface 305 showing drug related information for four different drugs, such as donepezil, rivastigmine, rivastigmine transdermal patch and galantamine. In particular, the UI 305 shows data from a variety of review agencies indicated by the agency icons 302A-302F organized in reverse chronological order by year, indicating whether the agency recommends the drug, the date of the review and the like. In addition, map decision icons 304A-304D corresponding to a respective drug are shown, which when selected, displays the UI 307 of FIG. 3D. FIG. 3D is a screen shot of an exemplary user interface 307 illustrating a decision map for the drug donepezil, indicating via color coding or other graphic indicia the agencies that have reviewed the drug and the agency recommendation for the drug. This information is provided adjacent to the country with which the agency is affiliated or could be presented upon hovering the position of a pointing device over such country on the illustrated map graphic. FIG. 3E is a screen shot of an exemplary user interface 309 indicating the prevalence metrics associated with Alzheimer's disease in various countries. These prevalence metrics help support the context of understanding the burden of disease as well as market size.

If, in the UI 305 of FIG. 3C, a user selects one of the review agency icons, such as icon 302A, the UI 311 of FIG. 3F is presented. FIG. 3F is a screen shot of an exemplary user interface 311 illustrating additional data provided in the reports prepared by the review agency indicated by the icon 302A for each of the four drugs. The additional data may comprise any of the dosages evaluated, the evidence sources and the evaluators, etc. In addition, the additional data may comprise any of the recommendation decision, date of review, the eligible patient population, key criteria, stated clinical reason for the recommendation decision, the stated economic reason for the recommendation decision and key study questions, as shown in UI 313 of FIG. 3G. FIG. 3G is a screen shot of an exemplary user interface 313 illustrating additional data from the reports prepared by the review agency, which may comprise any of the outcomes measured, adverse events, conclusions on clinical effectiveness. and additional data from the reports prepared by the review agency, including model details associated with evaluated studies, manufacturers and assessment groups. Moreover, data associated with outcomes measured, quality-adjusted life year (QALY), incremental cost-effectiveness ratio (ICER) and conclusions on cost and economic effectiveness may be shown. Note that links to the actual decision documentation may be associated with icons 302A-302F or titles as illustrated in FIG. 3G.

If, in the UI 311 of FIG. 3F, an icon 306 is selected, the UI 315 of FIG. 3H is presented to the user. FIG. 3H, is a screen shot of an exemplary user interface 315 having a timeline indicating relevant activity associated with any of the drugs related to Alzheimer's disease is shown. This includes data corresponding to patent issuance and expiration, FDA approval decisions, agency review decisions and the like. Other user interface arrangements, similar or different to those illustrated in FIGS. 3A-H, may be similarly utilized to receive and/or present the relevant data to a user.

Clinical Trial Tracking Software Application

Referring now to FIG. 4, the computer architecture 400 includes the clinical trial tracker application 402, which is configured to retrieve data from one or more data sources 420, synthesize the retrieved data in a contextual manner, store the synthesized data in a drug specific relational database 430 and present relevant drug related information from the drug specific relational database 430 to one or more users 440. Application 402 may be similar in architecture and function as application 102, described previously herein. It can be appreciated that users of the clinical trial tracker application 402 may also include customers, such as pharmaceutical and insurance companies, universities, researchers and financial analysts and the like.

In particular, the clinical trial tracker application 402 includes a content aggregation module 404 that can aggregate data from various sources, such as the sources 420. Once the data is aggregated, the content aggregation module 404 synthesizes the data from the data retrieved from the sources. In various embodiments, the data is synthesized based on various characteristics or parameters. For instance, data may be identified by its relationship to a particular drug, a type of drug, a disease, or a geographic region, amongst others. Additional details regarding the type of data and the manner in which the drug is classified will become more apparent during a description of FIGS. 5A-5F. The synthesized data is then stored in the drug specific relational database 430.

The data stored in the drug specific relational database 430 may be classified such that each item of data can be accessed by a user through a search process. Data corresponding to a particular drug may be classified under the drug name, along with one or more parameters with which the drug is associated.

In various embodiments, some of the operations performed by the content aggregation module 404 may be performed by a human user. For instance, a human may read through various agency reports to determine if the agency recommends a drug, determine the dosage of the drug and the like. The human may then provide the information to the content aggregation module 404 through a user interface. Module 404 then stores such information in the drug specific relational database 430. In some embodiments, the content aggregation module 404 may also be configured to crawl through various documents retrieved from the sources to gather pertinent information. The information may be gathered using keyword searches, or similar content recognition technologies that currently exist.

The clinical trial tracker application 402 may also include a user request module 406 configured to receive and process requests for data from the users 440 and a content retrieval module 408 configured to retrieve the requested data from the drug specific relational database 430. The drug specific relational database 430 may include one or more databases that store drug and disease related content aggregated by the content aggregation module 404.

The clinical trial tracker application 402 may also include a content presentation module 410 configured to present the requested data in a manner that is simple, clear and focused. This is possible due to the manner in which the data is classified by the clinical trial tracker application 402 since relationships between data fields stored in the database 430 are established when the data is synthesized and stored by the content aggregation module 404.

The algorithmic processes performed by the clinical trial application 402, including its constituent components modules 404, 406, 408 and 410 in interacting with sources 420, drug database 430 and users 440 may be substantially similar to that previously described with reference to application 102 and its constituent components modules 204, 206, 208 and 210, respectively, and as described in the flow process illustrated in FIG. 2D. Similarly, sources 420, database 430 and users 440 may be similar in implementation and function to sources 120, database 130 and users 140, respectively, of FIG. 2C. Similarly, the network environment in which application 402 may be implemented relative to sources 420, database 430 and users 440 may be similar in that of application 102 relative to sources 120, database 130 and users 140, respectively, of FIG. 2B.

The data sources 420 may be publicly available information that is stored remotely at storage locations accessible to the clinical trial tracker application 402 over a network, such as a private local network, or a public network, such as the Internet. The data sources may be websites that store drug related information, including but not limited to, drug agencies that evaluate drugs, medical references, such as journals, thesis, papers and publications, university databases, amongst others. Sources 420 may also comprise information in hard copy (not electronic) format.

The clinical trial tracker application 402 provides companies the ability to view clinical trial studies and outcomes across a number of different markets to understand the evaluation criteria as well as the conclusions of clinical trial studies. The clinical trial tracker application 402 is configured to identify relevant data sources, aggregate relevant data from the data sources, as well as clean, organize and add or connect relevant datasets in a meaningful manner. In addition, the clinical trial tracker application 402 is configured to determine metrics associated with clinical trials that are relevant to companies and can build algorithms for those metrics. Moreover, like the reimbursement risk tracker application 102, the clinical trial tracker application 402 can generate customized reports from datasets with context to create wisdom from data.

Figure 5A:
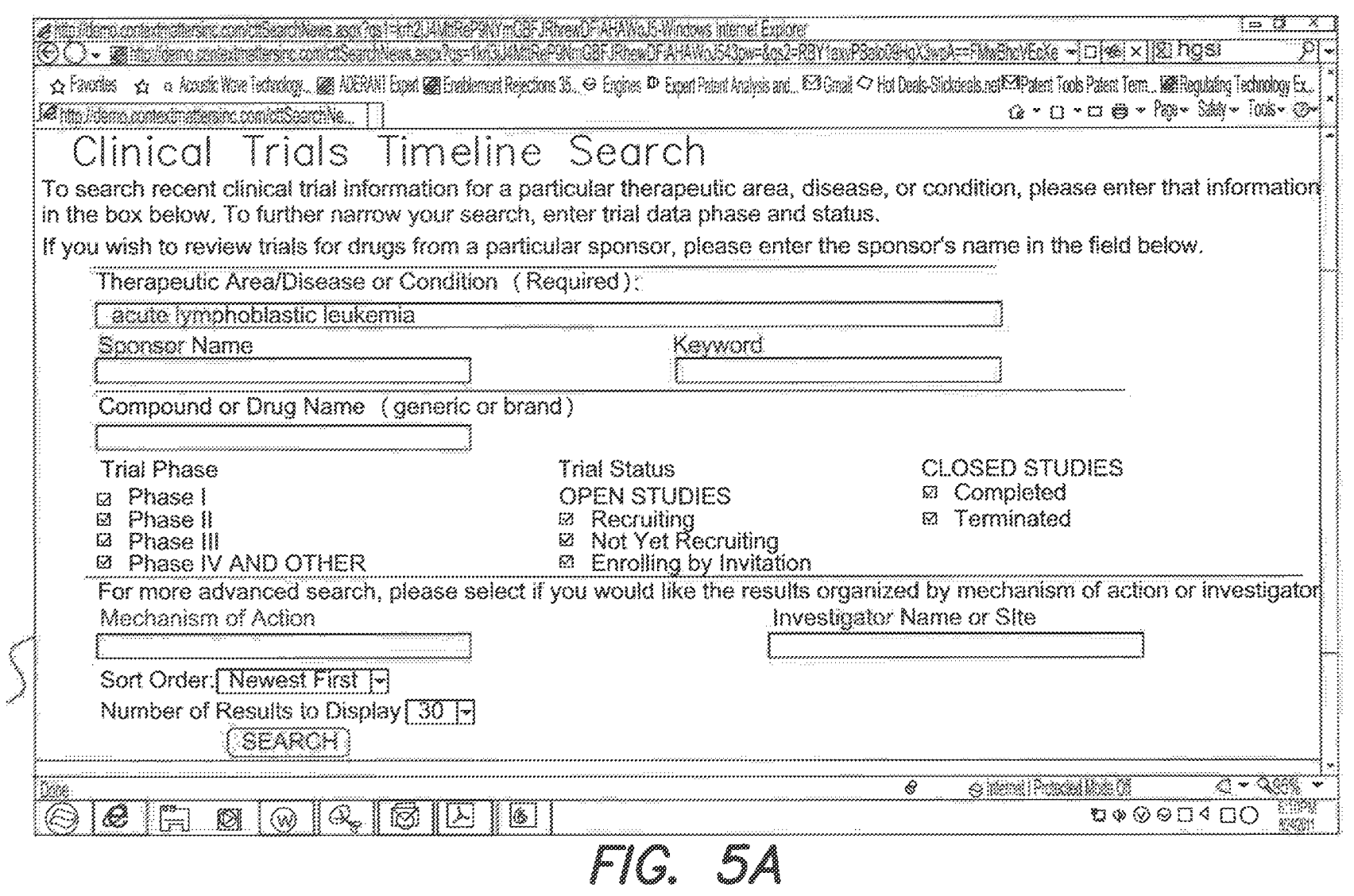
Figure 5C:
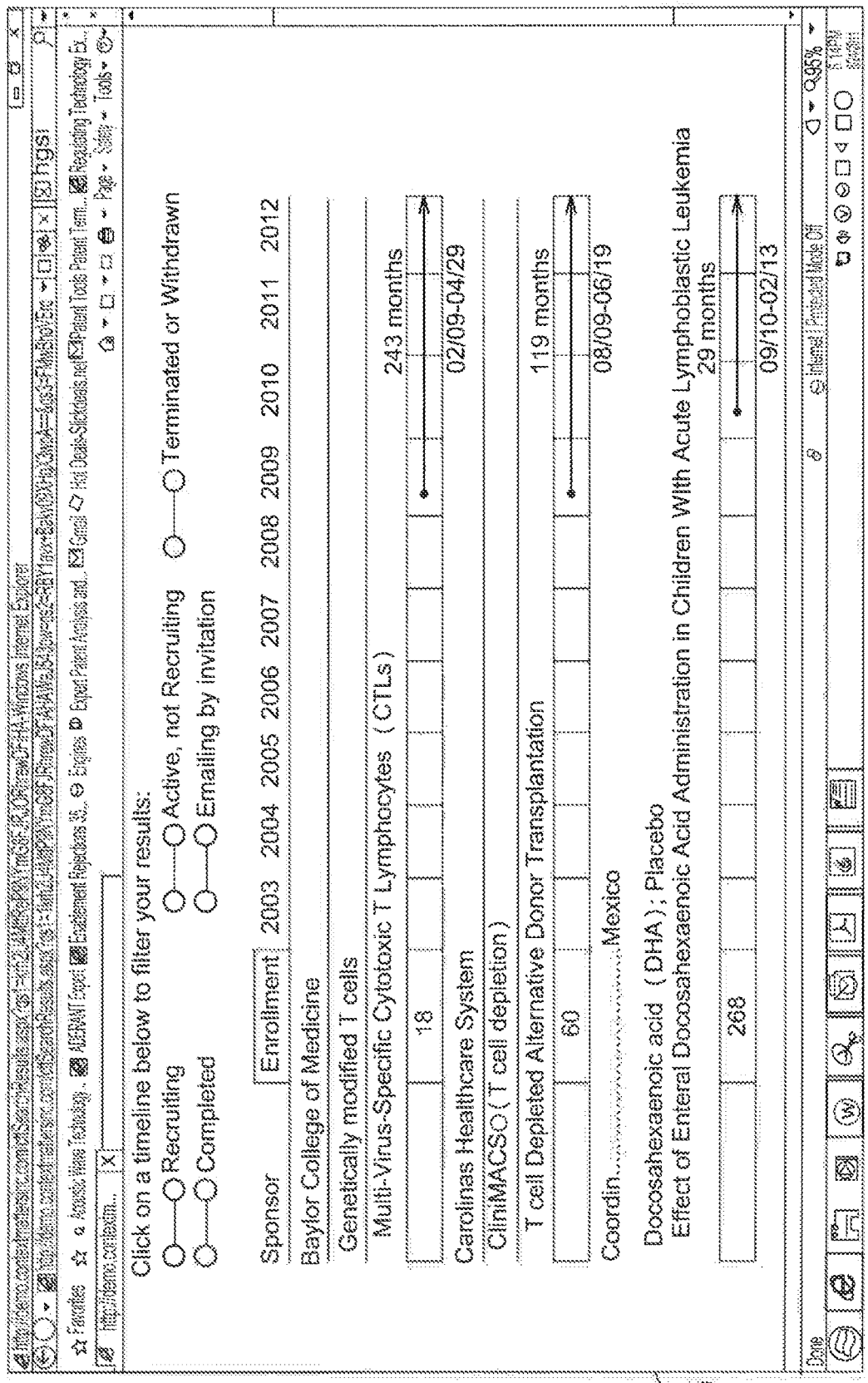

Referring now to FIGS. 5A-5F, exemplary UI screen shots generated by the clinical trial tracking software application 402, in accordance with an embodiment of the disclosed system are also shown. FIG. 5A illustrates an exemplary screen shot of a user interface 500 of a clinical trial tracking application through which users can search for data related to clinical trials associated with any of a particular disease, drug, sponsor, company, compound name and the like, using one or more dialog boxes or other interactive data entry mechanisms. The search can be limited to one or more types of trial phases, trial statuses and studies, or any combination thereof. Additional search options selectable through the UI may include a mechanism of action or investigator name or site.

Upon entering search parameters, the exemplary user interface 502, shown in FIG. 5B, is presented and indicates the number of studies found in response to the search query parameters entered through interface 500. A breakdown of the searches by phase, type, enrollment status, amongst others is shown. In addition, an average timeline and size of enrollment is also presented.

FIG. 5C illustrates a screen shot of an exemplary user interface 504 showing details associated with one or more of the trials satisfying the search query. The data may be visually presented in reverse chronological order, starting with the latest trials. The details indicate the sponsor, location, type of clinical trial, enrollment size and status of the trial, amongst other details.

Figure 5D:
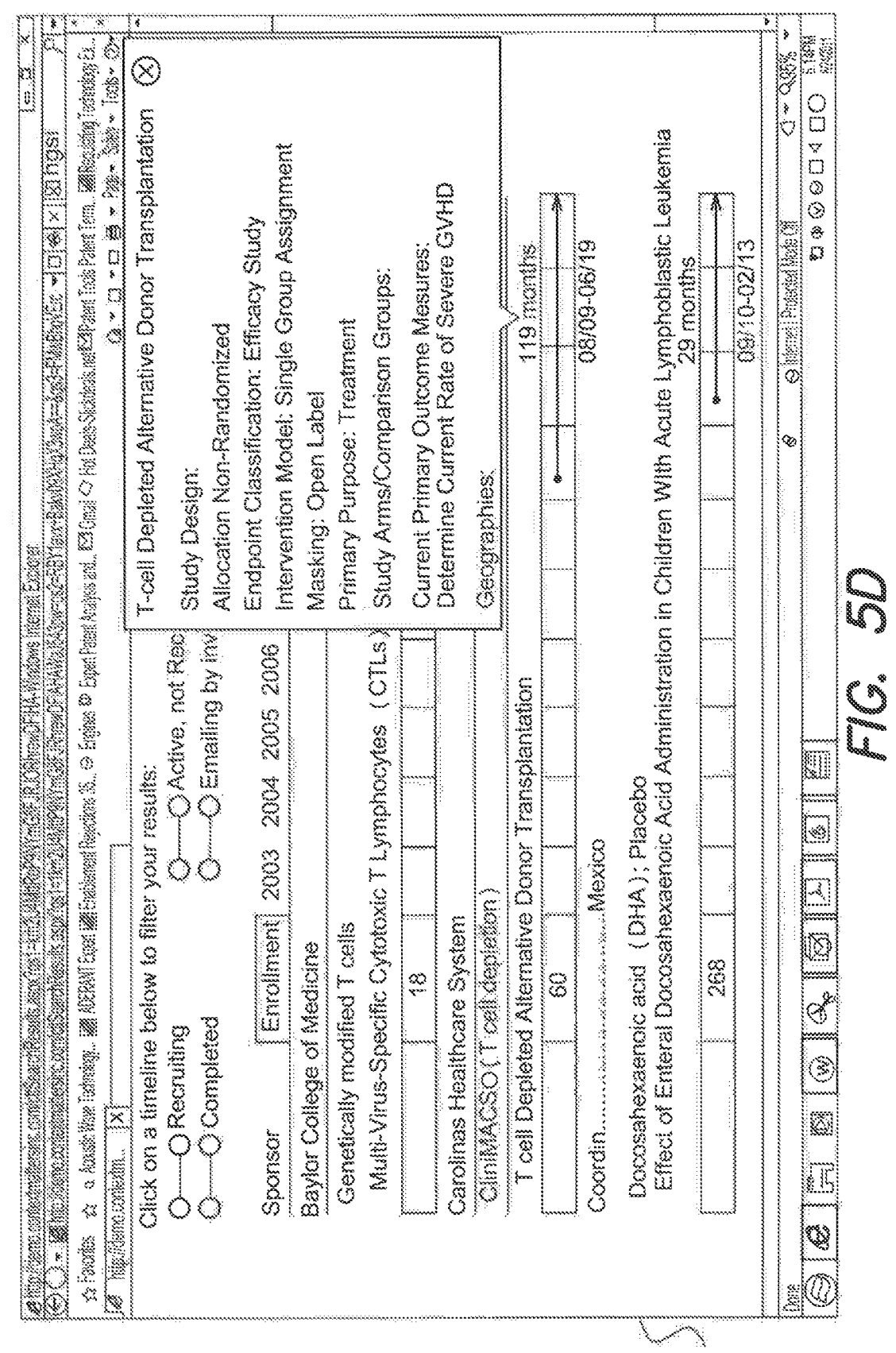
Figure 5F:
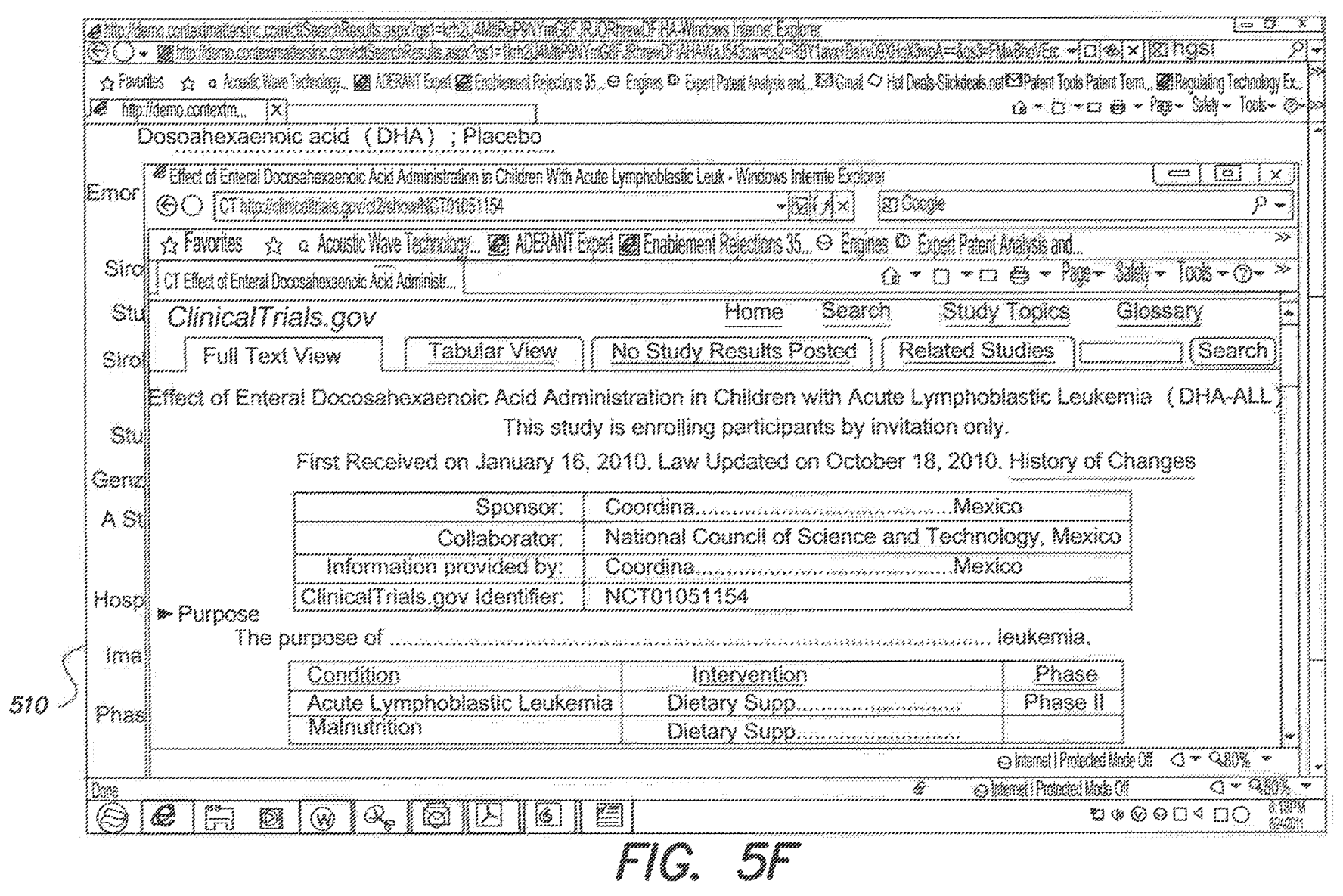

FIG. 5D illustrates a screen shot of an exemplary user interface 506 showing additional details regarding a particular clinical trial. FIG. 5E illustrates a screen shot of an exemplary user interface 508 showing additional details regarding the eligibility criteria for enrolling in a particular clinical trial. FIG. 5F illustrates a screen shot of an exemplary user interface 510 showing the source of the clinical trial data, which may be provided to the user upon request.

It should be appreciated that all of the clinical trial data that is presented in user interfaces 500-510 of FIGS. 5A-5F may be aggregated by clinical trial tracker application 402, in a manner similar to that performed by reimbursement risk tracker application 102. In addition, clinical trial tracker application 402 may facilitate the aggregation of data from additional sources, including but not limited to, sources that provide clinical trial data, such as www.clinicaltrials.gov. Other user interface arrangements, similar or different to those illustrated in FIGS. 5A-F, may be similarly utilized to receive and/or present the relevant data to a user.

Figure 12:
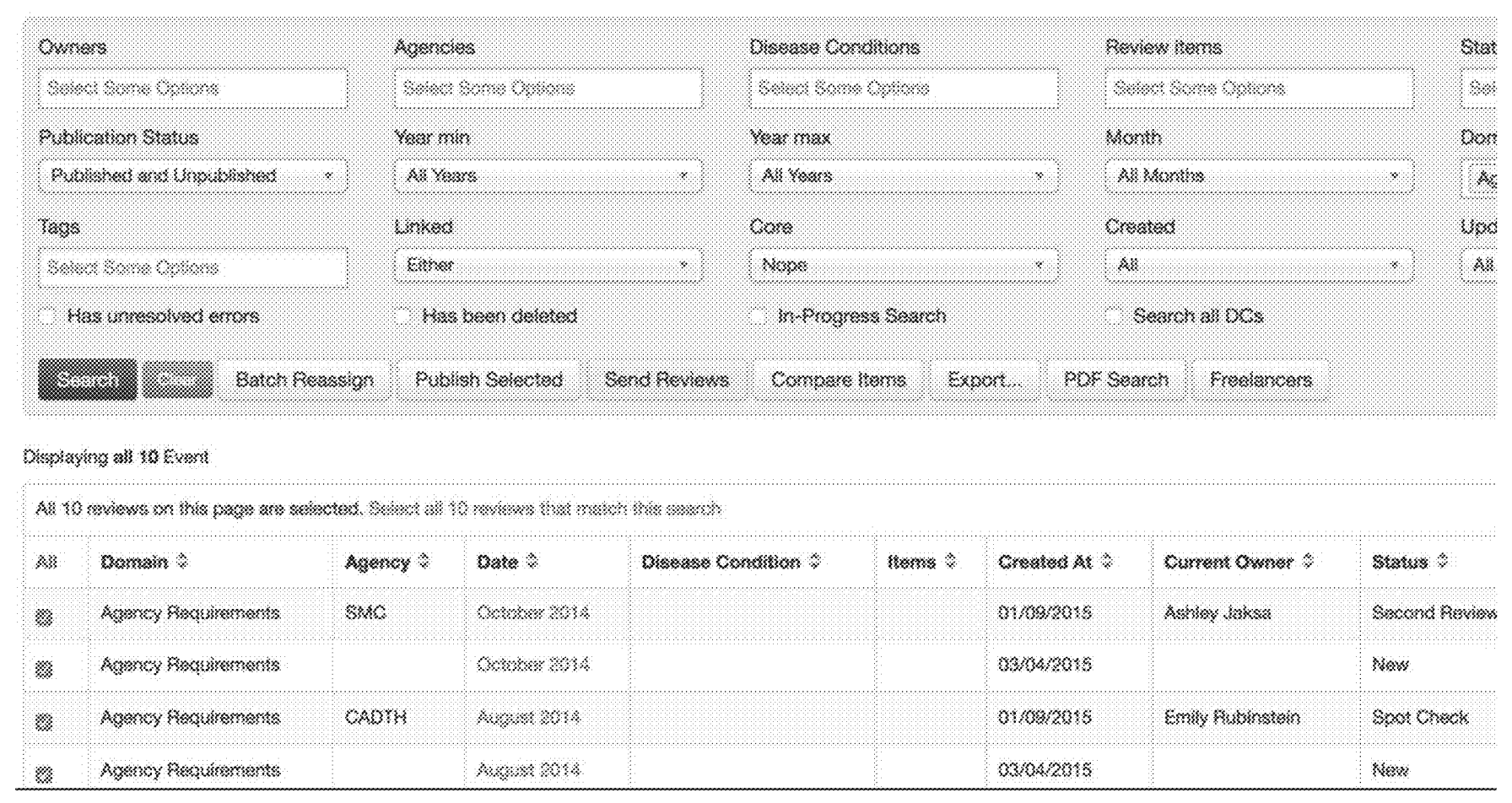
Figure 13:
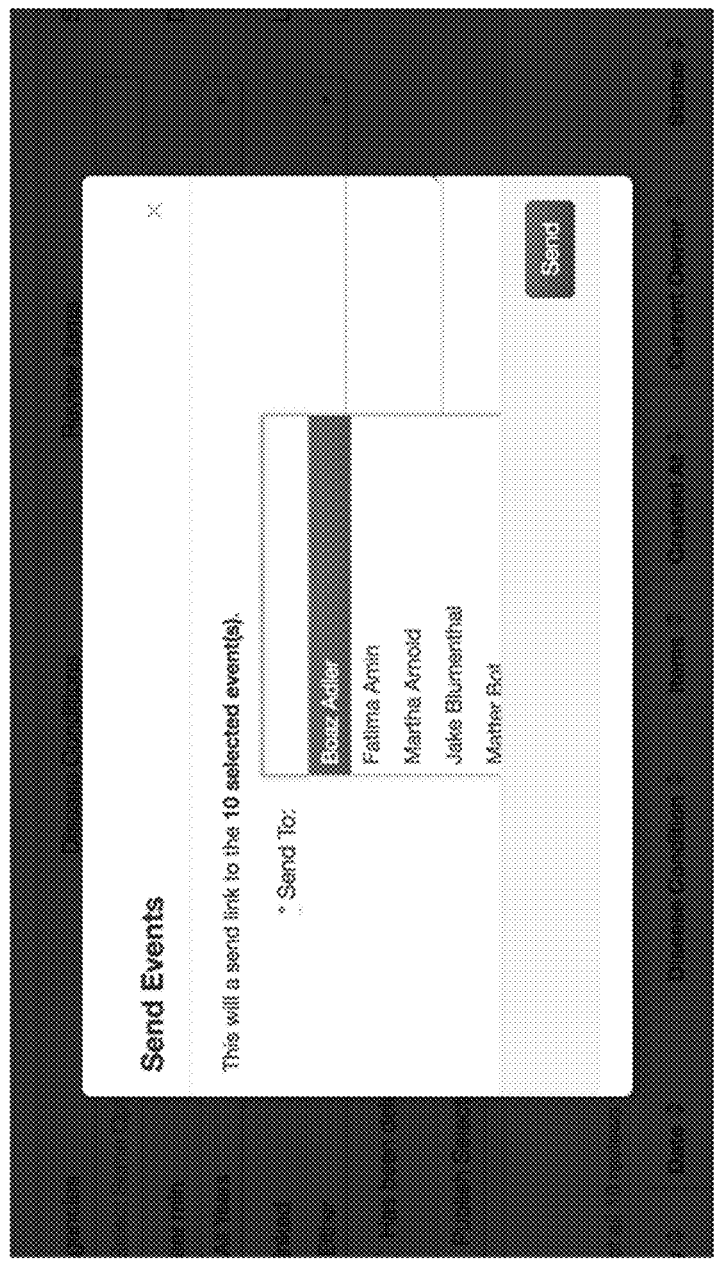
Figure 14:
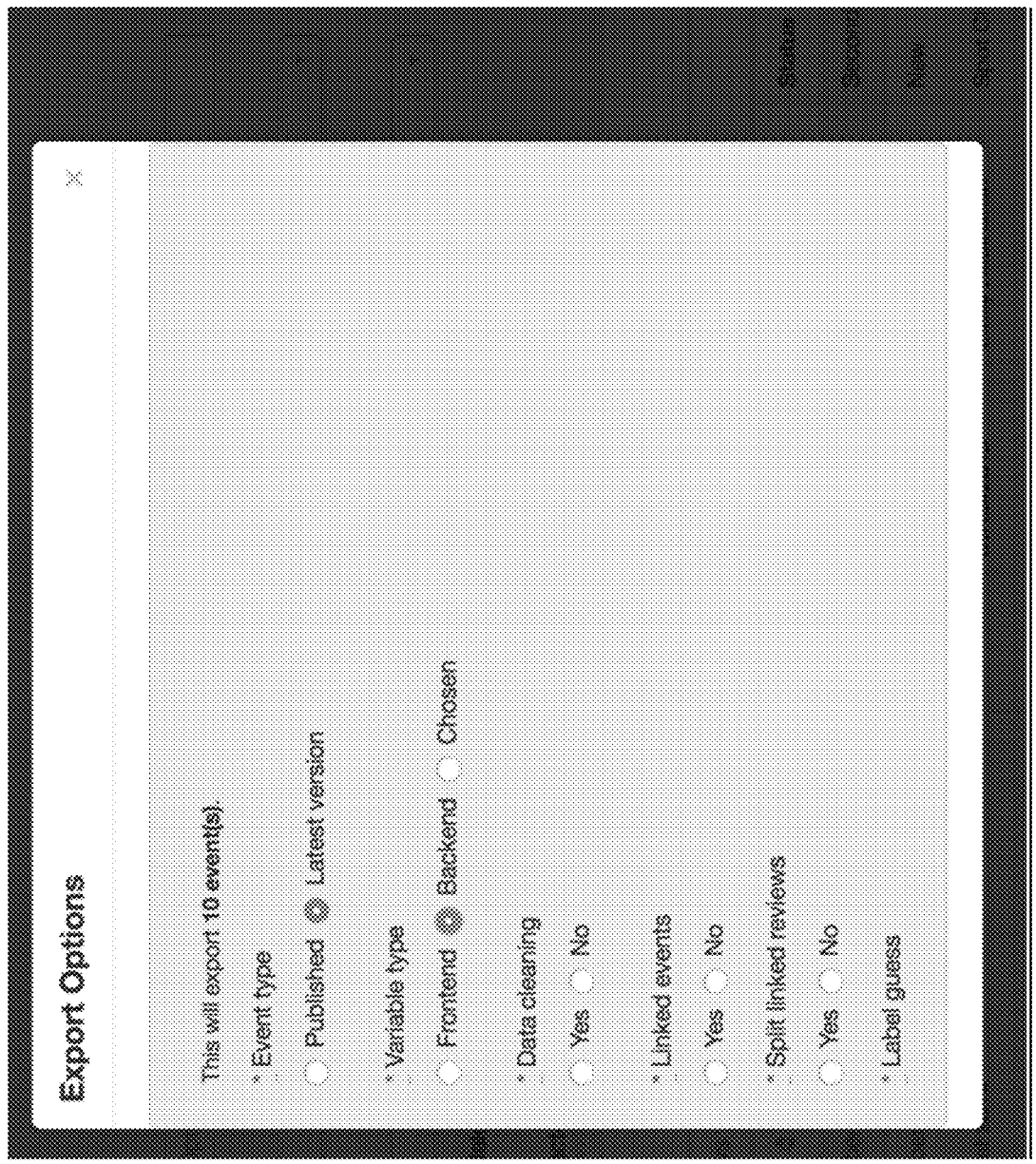

In addition to the foregoing, systems and methods for managing data and configuring the workflow with respect to the handling of unstructured data, the assignments of tasks and other functions related to the collection of data are also provided as shown in FIGS. 12-14.

Figure 15:
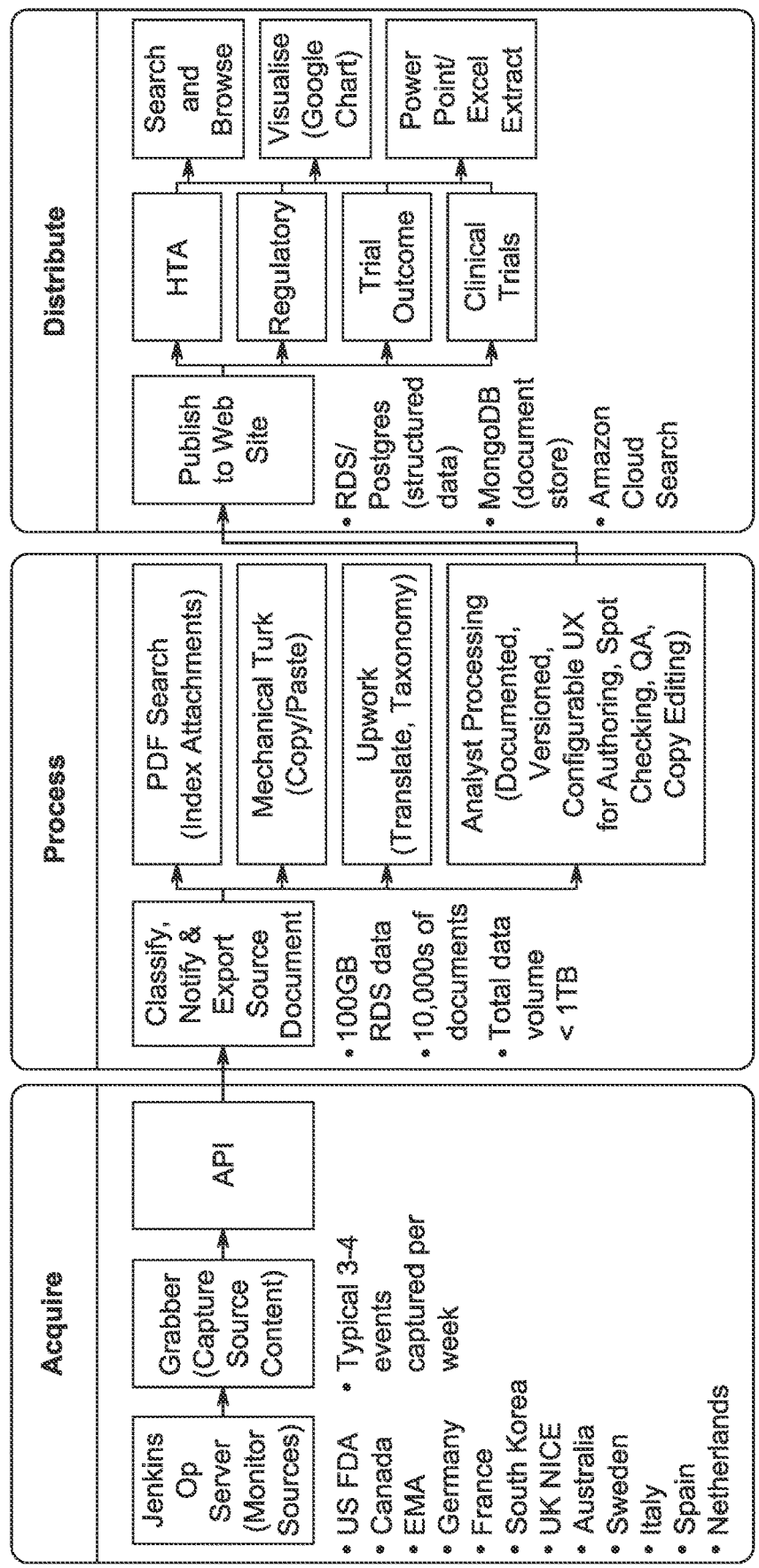
FIG. 15 illustrates an exemplary data management and configurable workflow system.

Data Management System and Configurable Workflow for Processing Unstructured Data into Structured Data In another aspect, a data management and configurable workflow system, as shown in FIG. 15, provides for converting unstructured data into structured data sets and is centered around a concept referred to as an "Event," i.e., a corpus of data from a single source on a single date. Every Event is versioned, allowing for change-management and auditing. Every Event has an owner analyst and only that owner analyst can edit the Event's data. For situations where batch editing is required, however, spreadsheet-based importing/exporting, for example, is provided, which maintains the ownership and versioning capabilities.

UI for Defining and Managing Discrete Data Extraction Tasks

Further, a system for defining and managing discrete data extraction tasks offloads time-consuming data extraction tasks to a variety of vendors. Assignments are created in the system, by managers using the UI to, for example, send an arbitrary set of Events to a single freelance operator or thousands, depending on the size and complexity of the project. Data is received via a software-controlled application and can be manipulated.

System for Developing and Standardizing Taxonomies

In addition, a UI for developing and standardizing taxonomies is provided. This UI allows domain experts to define arbitrary taxonomies via screens within the web-based application. Taxonomies are defined by creating a Domain that contains one or more Variable Groups, as shown in FIG. 10, which in turn contain one or more Variables, as shown in FIG. 11. A "Domain" is defined to hold all information necessary to define a dataset, including variables and identifying information. A "Variable Group" creates a User Interface of one or more variables configured to enter and storing data in a Domain. Additional variables can be added as needed: variables can contain text, numerical, preset "multi-select values," references, multiple references, dates or Boolean data and have descriptive metadata, including a title, system name and entry guidelines attached.

System for Entering and Structuring Data from Web Pages

Still further, a system for entering and structuring data from web pages is provided that takes data from websites and enters the data into a database in a structured manner by parsing publicly accessible data sources, extracting nodes of information, standardizing, determining a "Unique Key" for the source, and cross-referencing those nodes against known values, then submitting them as new "Events" via the API. Data is kept up-to-date automatically and deduplication is performed via the "Unique Key" to ensure that the same data is not entered more than once. Automatic matching against entities in a database, for example, drug names, ensures that data is usable in the context of the system described herein.

System for Integrating Data from Complimentary Data Providers

Still further, a system for collecting, integrating, cleaning and presenting data from other sources, for example, as provided by other vendors is provided. Other domains of data are combined with the structured data produced as described herein by extracting nodes of information, standardizing the data, and determining a "Unique Key" for the source. These nodes of data are cross-referenced against known values, and are then submitted as new "Events" via, for example, a spreadsheet file or via an API. Advantageously, data is kept up-to-date and deduplication is performed via the "Unique Key" to ensure that the same data is not entered more than once. A process of matching against entities in a database, for example, drug names, ensures that data is usable in the context of the system described herein.

System for Granting Access to Arbitrary Configurations of Data

A UI for granting access to arbitrary configurations of data is provided. More specifically, a "User" is defined to be part of one or more "Teams." A "Team" is granted access to any number of "Modules" that combine a configuration of the visual interfaces, specifying the scope of properties in the user interface, as well as a "Search" that scopes the events that can be made available in the aforementioned user interfaces.

Figure 6:
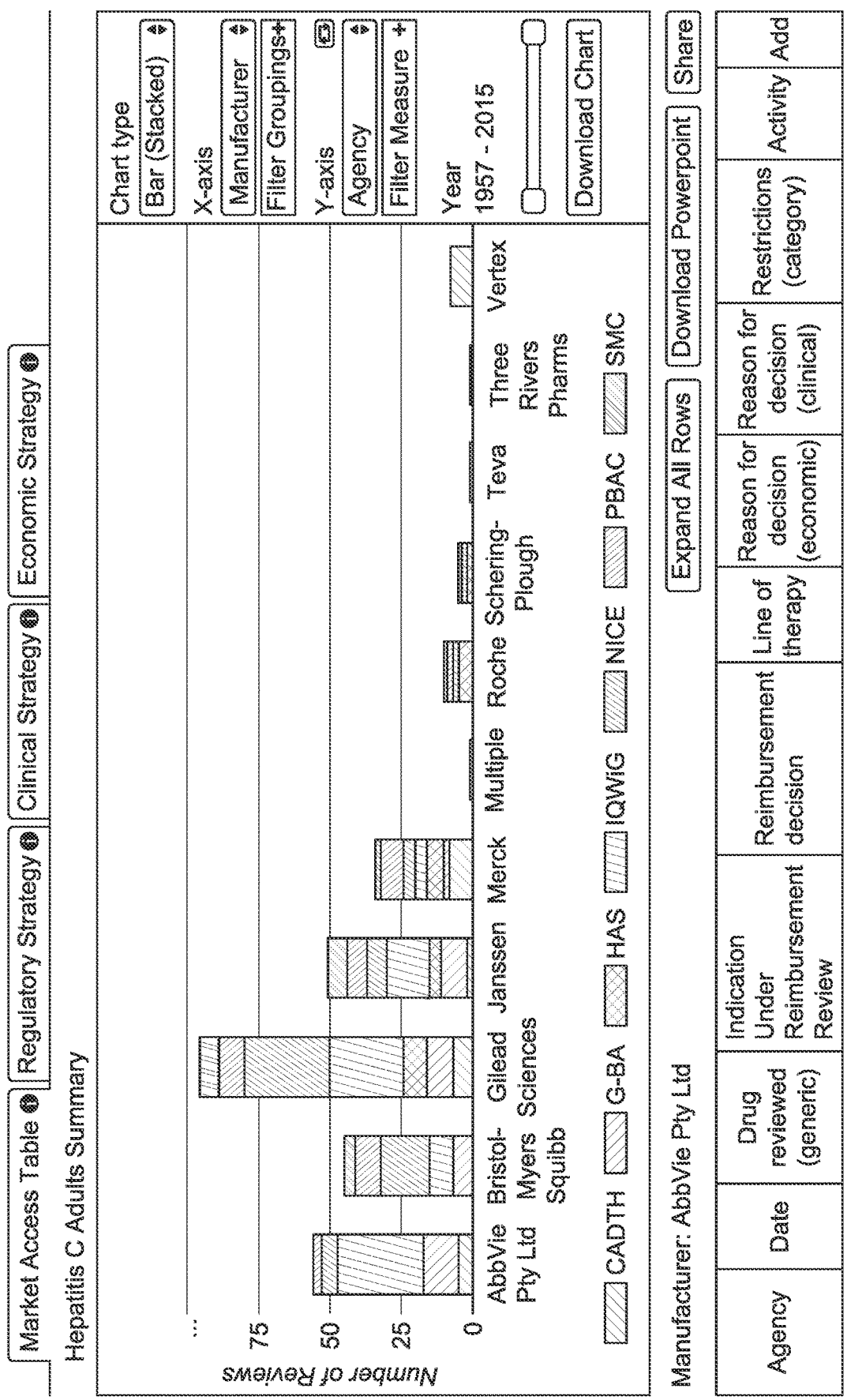
FIG. 6 illustrates an exemplary user interface for navigating and visualizing the details of a range of data by organizing the information around common entities that are frequent within the dataset.
Figure 7:
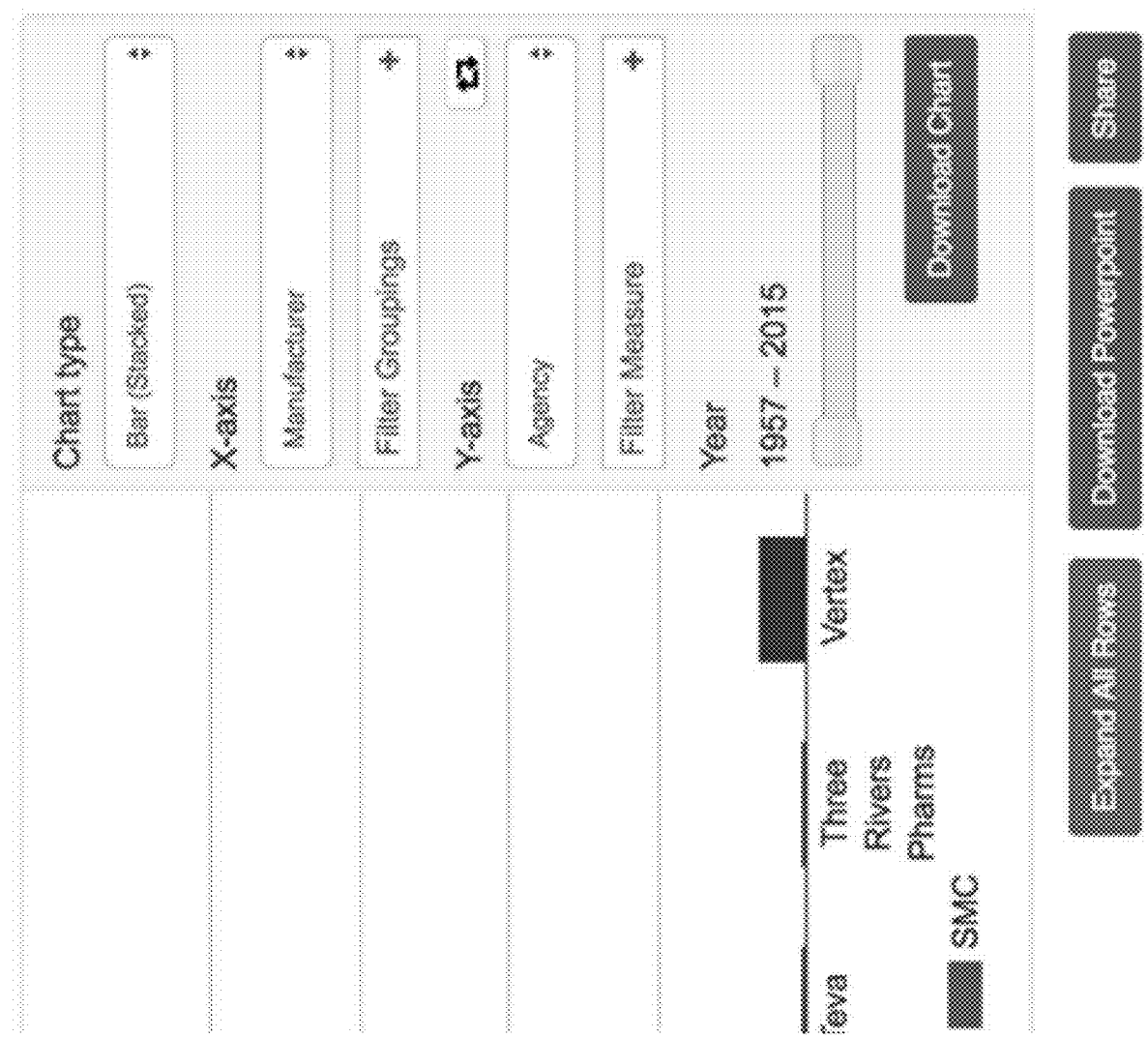
FIG. 7 illustrates an exemplary user interface that visualizes unique properties of data units in aggregate.

System for Configuring Interface for Visualizing Arbitrary Configurations of Data Further, a system for configuring an interface for visualizing arbitrary configurations of data that comprises a "Tab" containing a "Chart" and a "Tabular View" is implemented, as shown in FIG. 6. The "Chart" inherits a configurable "Scope" and defines user interactive controls for the X and Y axis variables, as well as a chart type, as shown in FIG. 7.

Figure 8B:
FIG. 8B illustrates a second portion of the user interface of FIG. 8A.

A "Tabular View," referring to FIGS. 8A and 8B (collectively referred to herein as FIG. 8), is organized by the X and Y axis selections in the chart so the Chart and the Tabular View show different facets of the same data. The "Tabular View" is comprised of "Tables" that represent each discrete grouping in the X axis. In a "Table," the Y axis selection groups available data into "Summary Rows" showing one or more pieces of information as organized by "Summary Columns." Upon user interaction, a "Summary Row" can be expanded to show each individual piece of information, as well as provide the ability to open and extend a "Tertiary Row" containing more information that cannot otherwise fit in the "Summary Columns."

System for Visualizing Arbitrary Configurations of Data

Still further, a system for visualizing arbitrary configurations of data at different ranges of scales, from a single data unit ("event details"), a few data units ("comparison of a few events"), many data units ("table of tens or hundreds of events"), many-many data units ("chart of thousands of events") is provided.

Figure 9A:
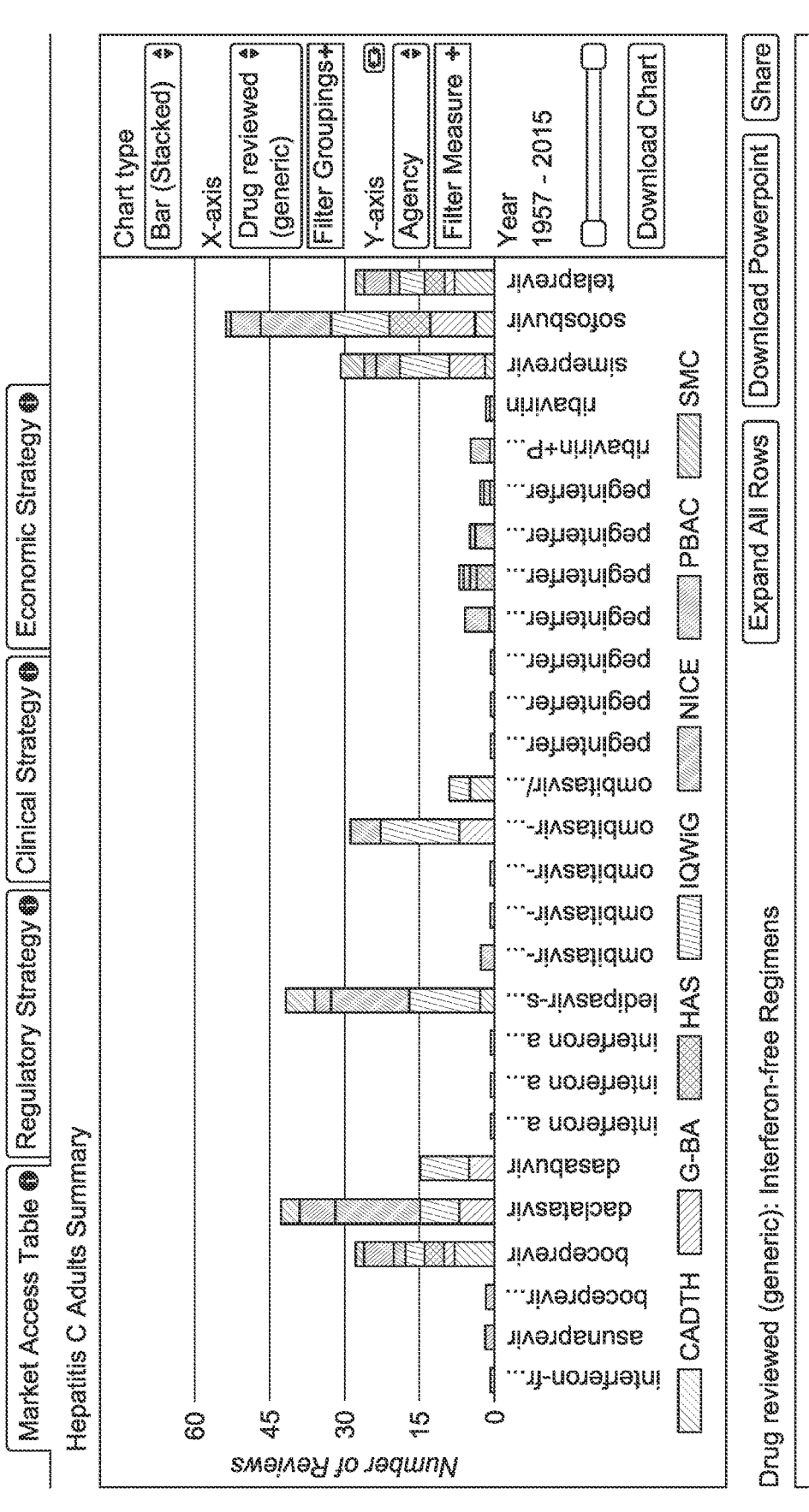
FIG. 9A illustrates a first portion of an exemplary user interface for navigating and visualizing the details of a range of data and organizes the information around common entities that are frequent within the data set and provides common tools for each entity.

A user interface, as shown in FIGS. 9A and 9B (collectively referred to herein as FIG. 9), provides for navigating and visualizing the details of a range of data by organizing the information around common entities that are frequent within the dataset and providing common tools for each entity is implemented. In one example, access to data organized by "Company," "Agency," "Manufacturer" and "Drug," each of which provides one or more "Tabs" containing a "Chart" and a "Tabular View" designed to visualize from a few to many data units in one view is implemented.

Referring to FIG. 8, the "Tabular View" allows the User to inspect more detailed information about a smaller number of results. Upon interaction, a User can put one or more data units into her "Basket" and open a "Comparison" of the items selected side-by-side, in greater detail. The User can also select a single data unit and see all of the detail provided for that single unit. Further, the "Tabular View" is organized by the X and Y axis selections in the chart, so the Chart and the Tabular View show different facets of the same data. The "Tabular View" is comprised of "Tables" that represent each discrete grouping in the X axis within a "Table," the Y axis selection groups available data into "Summary Rows" showing one or more pieces of information, as organized by "Summary Columns." Upon user interaction, a "Summary Row" can be expanded to show each individual piece of information contained, as well as provide the ability to open and extend a "Tertiary Row" containing more information that cannot fit in the "Summary Columns."

As shown in FIG. 9, a user interface for navigating and visualizing the details of a range of data organizes the information around common entities that are frequent within the dataset and provides common tools for each entity. For example, access to data organized by "Company," "Agency," "Manufacturer" and "Drug," each of which provides one or more "Tabs" containing a "Chart" and a "Tabular View" designed to visualize a few to many data units in one view is implemented. A "Chart" visualizes unique properties of data units in aggregate. The "Tabular View" is designed to allow the User to inspect more detailed information about a smaller number of results. Upon interaction, a User can put one or more data units into her "Basket" and open a "Comparison" of the items selected side-by-side, in greater detail. The User can also select a single data unit and see all of the provided details.

Whereas many alterations and modifications will no doubt become apparent to a person of ordinary skill in the art after having read the foregoing description, it is to be understood that the particular embodiments shown and described by way of illustration are in no way intended to be considered limiting. The foregoing examples have been provided merely for the purpose of explanation and are in no way to be construed as limiting of the present disclosure. Those skilled in the art will also recognize that the disclosed system has a broad range of applications and that the embodiments admit of a wide range of modifications without departing from the inventive concepts.

What is claimed is:

1. A method, implemented in a computer, of processing data related to a target, the computer comprising a processor and a memory configured to store a plurality of instructions executable by the processor to implement the method, the method comprising:
    retrieving data related to the target from one or more data sources, wherein the target comprises at least one of a target drug or a target therapeutic treatment, wherein the one or more data sources comprises publicly available information related to the target;
    synthesizing the retrieved target data in a contextual manner and creating synthesized target data by converting unstructured data into structured data including an event, wherein the event comprises a corpus of data from a single source on a single date;
    storing the synthesized target data in a target specific database;
    receiving a user query regarding the target, the user query comprising at least one search parameter;
    processing the received user query against the synthesized target data in the target specific database; and
    presenting results from the user query processed against the synthesized target data.

2. The method of claim 1, wherein the event has a corresponding version identifier.

3. The method of claim 1, wherein the event has a corresponding owner, wherein only the owner can edit information in the event.

4. The method of claim 1, further comprising:
    defining a domain comprising a plurality of variable groups, wherein each domain comprises a dataset of variables and identifying information.

5. The method of claim 4, further comprising:
    adding variables to the domain,
    wherein the added variables are chosen from: text, numerical, predetermined multi-select values, references, dates, Boolean data and descriptive metadata.

6. The method of claim 1, wherein presenting results further comprises:
    providing a user interface for navigating and visualizing data by organizing around common entities that occur frequently within a dataset.

7. The method of claim 1, wherein the user query is directed to one of:
    reimbursement with respect to the target; or
    clinical trial results with respect to the target.

8. The method of claim 1, further comprising:
    defining resources in the one or more data sources as a function of a predetermined parameter,
    wherein the predetermined parameter comprises at least one of a disease or a pharmaceutical drug.

9. The method of claim 1, further comprising:
    extracting a node of information from a data source;
    assigning a unique key to the extracted node of information; and
    adding the extracted node to the stored synthesized target data.

10. The method of claim 9, further comprising:
    adding the extracted node in response to the assigned unique key not matching a key of a node already in the stored synthesized target data.

11. A system comprising a processor and logic stored in one or more non-transitory, computer-readable, tangible media that are in operable communication with the processor, the logic configured to store a plurality of instructions that, when executed by the processor, causes the processor to implement a method of aggregating and contextualizing data related to a target, the method comprising:

retrieving data related to the target from one or more data sources, wherein the target comprises at least one of a target drug or a target therapeutic treatment, wherein the one or more data sources comprises publicly available information related to the target;

synthesizing the retrieved target data in a contextual manner and creating synthesized target data by converting unstructured data into structured data including an event, wherein the event comprises a corpus of data from a single source on a single date;

storing the synthesized target data in a target specific database;

receiving a user query regarding the target, the user query comprising at least one search parameter;

processing the received user query against the synthesized target data in the target specific database; and presenting results from the user query processed against the synthesized target data.

12. The system of claim 11, wherein the event has a corresponding version identifier.

13. The system of claim 11, wherein the event has a corresponding owner, wherein only the owner can edit the information in the event.

14. The system of claim 11, the method further comprising:

defining a domain comprising a plurality of variable groups, wherein each domain comprises a dataset of variables and identifying information.

15. The system of claim 14, the method further comprising:

adding variables to the domain, wherein the added variables are chosen from: text, numerical, predetermined multi-select values, references, dates, Boolean data and descriptive metadata.

16. The system of claim 11, wherein presenting results further comprises:

providing a user interface for navigating and visualizing data by organizing around common entities that occur frequently within a dataset.

17. The system of claim 11, wherein the user query is directed to one of:

reimbursement with respect to the target; or clinical trial results with respect to the target.

18. The system of claim 11, the method further comprising:

defining resources in the one or more data sources as a function of a predetermined parameter, wherein the predetermined parameter comprises at least one of a disease or a pharmaceutical drug.

19. The system of claim 11, the method further comprising:

extracting a node of information from a data source;

assigning a unique key to the extracted node of information; and adding the extracted node to the stored synthesized target data.

20. The system of claim 19, the method further comprising:

adding the extracted node in response to the assigned unique key not matching a key of a node already in the stored synthesized target data.

21. A non-transitory computer readable media comprising instructions stored thereon that, when executed by a processing apparatus, cause the processing apparatus to implement a method of aggregating and contextualizing data related to a target, the method comprising:

retrieving data related to the target from one or more data sources, wherein the target comprises at least one of a target drug or a target therapeutic treatment, wherein the one or more data sources comprises publicly available information related to the target;

synthesizing the retrieved target data in a contextual manner and creating synthesized target data by converting unstructured data into structured data including an event, wherein the event comprises a corpus of data from a single source on a single date;

storing the synthesized target data in a target specific database;

receiving a user query regarding the target, the user query comprising at least one search parameter;

processing the received user query against the synthesized target data in the target specific database; and presenting results from the user query processed against the synthesized target data.

22. The non-transitory computer readable media of claim 21, wherein the event has a corresponding version identifier.

23. The non-transitory computer readable media of claim 21, wherein the event has a corresponding owner, wherein only the owner can edit information in the event.

24. The non-transitory computer readable media of claim 21, the method further comprising:

defining a domain comprising a plurality of variable groups, wherein each domain comprises a dataset of variables and identifying information.

25. The non-transitory computer readable media of claim 24, the method further comprising:

adding variables to the domain, wherein the added variables are chosen from: text, numerical, predetermined multi-select values, references, dates, Boolean data and descriptive metadata.

26. The non-transitory computer readable media of claim 25, wherein presenting results further comprises:

providing a user interface for navigating and visualizing data by organizing around common entities that occur frequently within a dataset.

27. The non-transitory computer readable media of claim 21, wherein the user query is directed to one of:

reimbursement with respect to the target; or clinical trial results with respect to the target.

28. The non-transitory computer readable media of claim 21, the method further comprising:

defining resources in the one or more data sources as a function of a predetermined parameter, wherein the predetermined parameter comprises at least one of a disease or a pharmaceutical drug.

29. The non-transitory computer readable media of claim 21, the method further comprising:

extracting a node of information from a data source;

assigning a unique key to the extracted node of information; and adding the extracted node to the stored synthesized target data.

30. The non-transitory computer readable media of claim 29, the method further comprising:

adding the extracted node in response to the assigned unique key not matching a key of a node already in the stored synthesized target data.

* * * * *